(12) United States Patent
Okada et al.

(10) Patent No.: US 11,200,172 B2
(45) Date of Patent: Dec. 14, 2021

(54) STORAGE SYSTEM AND METHOD OF CONTROLLING STORAGE SYSTEM

(71) Applicant: Hitachi, Ltd., Tokyo (JP)

(72) Inventors: Naoya Okada, Tokyo (JP); Tomohiro Yoshihara, Tokyo (JP); Takashi Nagao, Tokyo (JP); Ryosuke Tatsumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 112 days.

(21) Appl. No.: 16/568,314

(22) Filed: Sep. 12, 2019

(65) Prior Publication Data

US 2020/0310975 A1   Oct. 1, 2020

(30) Foreign Application Priority Data

Mar. 28, 2019 (JP) .............................. JP2019-062386

(51) Int. Cl.
| | |
|---|---|
| *G06F 12/00* | (2006.01) |
| *G06F 12/0871* | (2016.01) |
| *G06F 12/14* | (2006.01) |
| *G06F 3/06* | (2006.01) |

(52) U.S. Cl.
CPC ........ *G06F 12/0871* (2013.01); *G06F 3/0614* (2013.01); *G06F 3/0659* (2013.01); *G06F 3/0683* (2013.01); *G06F 12/1441* (2013.01)

(58) Field of Classification Search
None
See application file for complete search history.

(56) References Cited

U.S. PATENT DOCUMENTS

| 9,785,355 B2* | 10/2017 | Huang ................ H04L 67/1004 |
| 2018/0032266 A1* | 2/2018 | Yan ...................... G06F 12/0871 |
| 2020/0192601 A1* | 6/2020 | Okada ................... G06F 3/0659 |

FOREIGN PATENT DOCUMENTS

WO   2017/195324 A1   11/2017

* cited by examiner

*Primary Examiner* — Midys Rojas
(74) *Attorney, Agent, or Firm* — Mattingly & Malur, PC

(57) ABSTRACT

A storage system includes a plurality of controllers and a plurality of storage drives. A first cache area and a second cache area are set in a memory. The first cache area is permitted to be written data by the plurality of storage drives, and the second cache area is not permitted to be written data by the plurality of storage drives. In a case where the plurality of controllers duplicates data stored in the cache area to a cache area of another controller for redundancy, the plurality of controllers causes the data to be redundant in a second cache area of the other controller in a case where the data is stored in the first cache area, and causes the data to be redundant in a first cache area of the other controller in a case where the data is stored in the second cache area.

8 Claims, 22 Drawing Sheets

FIG. 3

| PHYSICAL DRIVE ID | VIRTUAL DRIVE ID |
|---|---|
| 0 | 1 |
| 1 | 3 |
| 2 | 5 |
| 4 | 7 |
| 5 | 2 |
| 6 | 4 |
| 9 | 6 |
| 10 | 8 |
| ⋮ | ⋮ |

FIG. 4

| VIRTUAL DRIVE ID | CACHE AREA NUMBER |
|---|---|
| 0 | 0 |
| 1 | 1 |
| 2 | 0 |
| 4 | 1 |
| 5 | 0 |
| 6 | 1 |
| 9 | 0 |
| 10 | 1 |
| ⋮ | ⋮ |

FIG. 5

| DRIVE ID | PHYSICAL ADDRESS | PAGE SIZE | MEMORY ACCESS ATTRIBUTE | |
|---|---|---|---|---|
| | | | Read | Write |
| 0 | 0x0_0000_0000 | 1 GB | Disallowed | Disallowed |
| | ⋮ | ⋮ | ⋮ | ⋮ |
| | 0x5_C000_0000 | 1 GB | Disallowed | Disallowed |
| | 0x6_0000_0000 | 1 GB | Allowed | Allowed |
| | ⋮ | ⋮ | ⋮ | ⋮ |
| | 0x3F_C000_0000 | 1 GB | Allowed | Allowed |
| | 0x40_0000_0000 | 1 GB | Allowed | Allowed |
| | ⋮ | ⋮ | ⋮ | ⋮ |
| | 0x5F_C000_0000 | 1 GB | Allowed | Allowed |
| | 0x60_0000_0000 | 1 GB | Allowed | Disallowed |
| | ⋮ | ⋮ | ⋮ | ⋮ |
| | 0x7F_C000_0000 | 1 GB | Allowed | Disallowed |
| | 0x80_0000_0000 | 1 GB | Disallowed | Disallowed |
| | ⋮ | ⋮ | ⋮ | ⋮ |
| | 0x7_FFFF_C000_0000 | 1 GB | Disallowed | Disallowed |
| 1 | 0x0_0000_0000 | 1 GB | Disallowed | Disallowed |
| | ⋮ | ⋮ | ⋮ | ⋮ |
| | 0x5_C000_0000 | 1 GB | Disallowed | Disallowed |
| | 0x6_0000_0000 | 1 GB | Allowed | Allowed |
| | ⋮ | ⋮ | ⋮ | ⋮ |
| | 0x3F_C000_0000 | 1 GB | Allowed | Allowed |
| | 0x40_0000_0000 | 1 GB | Allowed | Disallowed |
| | ⋮ | ⋮ | ⋮ | ⋮ |
| | 0x5F_C000_0000 | 1 GB | Allowed | Disallowed |
| | 0x60_0000_0000 | 1 GB | Allowed | Allowed |
| | ⋮ | ⋮ | ⋮ | ⋮ |
| | 0x7F_C000_0000 | 1 GB | Allowed | Allowed |
| | 0x80_0000_0000 | 1 GB | Disallowed | Disallowed |
| | ⋮ | ⋮ | ⋮ | ⋮ |
| | 0x7_FFFF_C000_0000 | 1 GB | Disallowed | Disallowed |
| ⋮ | ⋮ | ⋮ | ⋮ | ⋮ |

STORAGE SYSTEM AND METHOD OF CONTROLLING STORAGE SYSTEM

CLAIM OF PRIORITY

The present application claims priority from Japanese patent application JP 2019-62386 filed on Mar. 28, 2019, the content of which is hereby incorporated by reference into this application.

BACKGROUND OF THE INVENTION

1. Field of the Invention

The present invention relates to a storage system that controls IO processing using an IOMMU.

2. Description of the Related Art

A storage system includes a controller and a plurality of storage drives. The controller is connected to the plurality of storage drives through a back-end switch. Generally, serial attached SCSI (SAS) is used as a communication standard between the controller and the storage drives. A SAS communication path requires a dedicated interface for performing communication processing of each protocol. The storage system having a SAS communication path can prevent writing invalid data and the like, and thus can realize high reliability.

In recent years, non-volatile memory express (NVMe) is used as one of new communication standards. In a storage system employing NVMe, the controller and the storage drive are connected to each other via a PCI Express bus (PCIe bus). The storage drive is capable of directly accessing a memory in the controller. Using NVMe does not require processing of the SAS protocol, so it is possible to expect improvement of performance of IO processing.

In the storage system employing NVMe, a control for securing reliability as with the SAS protocol is not performed. Thus, it is not possible to prevent transfer of invalid data from the storage drive. Regarding this, a technology disclosed in WO 2017/195324 A is known.

WO 2017/195324 A discloses a method of controlling an access from a storage drive, as necessary, by rewriting an IO page table, in order to avoid data destruction due to writing of invalid data into a cache area.

SUMMARY OF THE INVENTION

IO processing with rewriting an IO page table, as with processing disclosed in WO 2017/195324 A, has a problem in that IO performance is degraded. In a case where failure occurs in the controller, there is a problem in that data which is in a dirty state and is stored in the cache area is lost.

An object of the present invention is to realize a storage system having high reliability and high IO performance and a method of controlling the storage system.

A representative example of the invention disclosed in this application is as follows. That is, a storage system includes a plurality of controllers, each including an arithmetic unit, a memory which is connected to the arithmetic unit and in which a cache area is set, and an interface connected to the arithmetic unit, and a plurality of storage drives. A first cache area and a second cache area are set in the memory. The first cache area is permitted to be written data by the plurality of storage drives, and the second cache area is not permitted to be written data by the plurality of storage drives. In a case where the plurality of controllers duplicates data stored in the cache area into a cache area of another controller for redundancy, the plurality of controllers causes the data to be redundant in a second cache area of the other controller in a case where the data is stored in the first cache area, and causes the data to be redundant in a first cache area of the other controller in a case where the data is stored in the second cache area.

According to the present invention, it is possible to realize a storage system having high reliability and high IO processing performance. Objects, configurations, and effects other than those described above will be clarified by the descriptions of the following embodiments.

BRIEF DESCRIPTION OF THE DRAWINGS

FIG. 3 is a diagram illustrating an example of storage-drive correspondence information included in control information in the embodiment;

FIG. 4 is a diagram illustrating an example of area allocation management information included in the control information in the embodiment;

FIG. 5 is a diagram illustrating an example of an IO page table in the embodiment;

DESCRIPTION OF THE PREFERRED EMBODIMENTS

Hereinafter, an embodiment of the present invention will be described with reference to the drawings. The present invention is not construed as being limited to the descriptions of the embodiment as follows. Those skilled in the related art can easily understand that the specific configuration may be changed in a range without departing from the concept or the spirit of the present invention.

In the configuration of the invention described below, the same or similar components or functions are denoted by the same reference signs, and repetitive descriptions will be omitted.

In this specification and the like, the notations "first", "second", "third", and the like are used for identifying the constituent elements, and the number or order is not necessarily limited.

Embodiment

Figure 1:
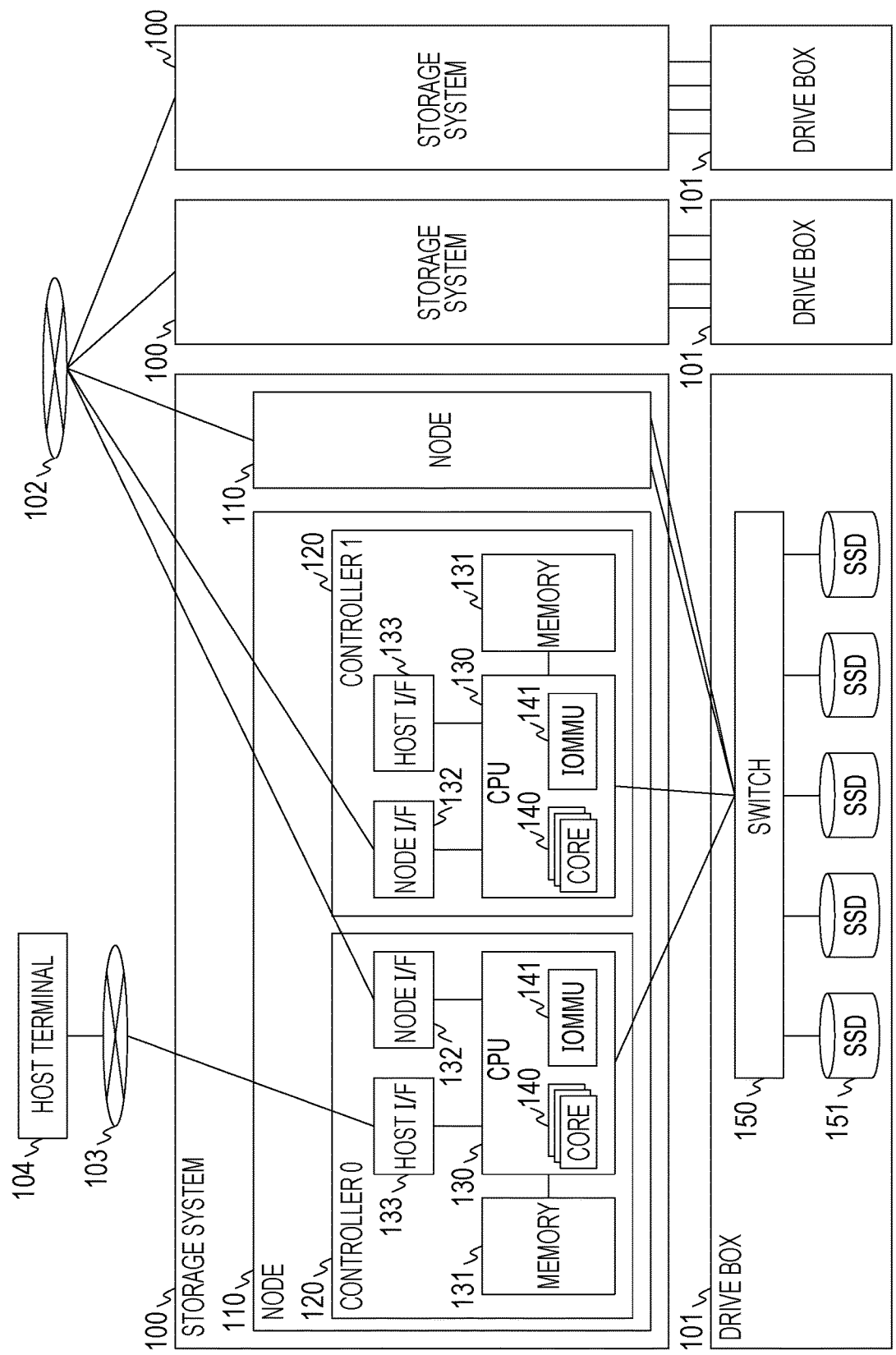
FIG. 1 is a diagram illustrating an example of a configuration of a computer system according to an embodiment.

FIG. 1 is a diagram illustrating an example of a configuration of a computer system according to the embodiment.

The computer system includes a plurality of storage systems 100, a plurality of drive boxes 101, and a host terminal 104. The plurality of storage systems 100 is connected to each other via a network 102. The host terminal 104 is connected to at least one storage system 100 via a network 103.

The configuration of the computer system illustrated in FIG. 1 is just an example, and the embodiment is not limited thereto. For example, a storage system in which the storage system 100 and the drive box 101 are integrated may be provided.

The networks 102 and 103 are a storage area network (SAN), a local area network (LAN), and a wide area network (WAN), for example. A connection method of the networks 102 and 103 may be any of a wireless method and a wired method.

The host terminal 104 is a computer that writes data in a storage area provided by the storage system and reads data from the storage area. The host terminal 104 includes a CPU, a memory, and an interface (not illustrated).

The drive box 101 is a device that accommodates a plurality of storage drives 151. The drive box 101 includes a switch 150 and the plurality of storage drives 151. A RAID group may be configured by the plurality of storage drives 151. The storage system 100 may generate a logical unit (LU) on the RAID group, as a storage area provided to the host terminal 104.

The switch 150 connects a CPU 130 in a controller 120 and the storage drive 151. In the embodiment, the CPU 130 and the switch 150 are connected to each other via a PCIe bus, and the storage drive 151 and the switch 150 are connected to each other via a PCIe bus. The switch 150 includes a plurality of ports connected to the storage drives 151.

The storage drive 151 is a device that provides a storage area used by the host terminal 104. In the embodiment, the storage drive 151 is an NVMe drive that performs processing based on an NVMe protocol. A SATA drive and the like may be provided in the storage drive 151. A single port NVMe SSD connected to a PCIExpress Switch connected to two CTLs may be provided. FIG. 1 illustrates a dual port NVMe SSD having high availability as an example of the storage drive 151.

The storage system 100 provides the storage area for the host terminal 104. The storage system 100 includes a plurality of nodes 110 and is connected to the drive box 101.

The node 110 is hardware that controls the storage system 100 and includes a plurality of controllers 120. The controller 120 includes the CPU 130, a memory 131, a node interface 132, and a host interface 133.

The CPU 130 is hardware that performs various operations, and includes a plurality of cores 140 and an input/output memory management unit (IOMMU) 141. The CPU 130 executes a program stored in the memory 131. The CPU 130 performs processing in accordance with the program, and thereby operates as a functional unit (module) that realizes a specific function. In the following descriptions, in a case where descriptions are made by using the functional unit as a subject, it is indicated that the CPU 130 executes the program of realizing the functional unit.

The core 140 is hardware that performs arithmetic processing. The IOMMU 141 controls an access to the memory 131 by the storage drive 151 connected to the CPU 130 via the PCIe bus, based on an IO page table 223 (see FIG. 2).

The memory 131 is a storage device configured by at least any one of a volatile storage element such as a dynamic random access memory (DRAM) and a non-volatile storage element such as a NAND Flash, a spin transfer torque random access memory (STT-RAM), and a phase-change memory (PCM). A storage area in which the program executed by the CPU 130 and various types of information are stored, and a storage area in which data is temporarily stored are set in the memory 131.

The node interface 132 is an interface for a connection with the node 110. The node interface 132 is a Fibre Channel adapter, for example.

The host interface 133 is an interface for a connection with the host terminal 104. The host interface 133 is an Ethernet adapter (Ethernet is a registered trademark), InfiniBand, a Host Bus adapter, a PCI Express bridge, or the like.

Figure 2:
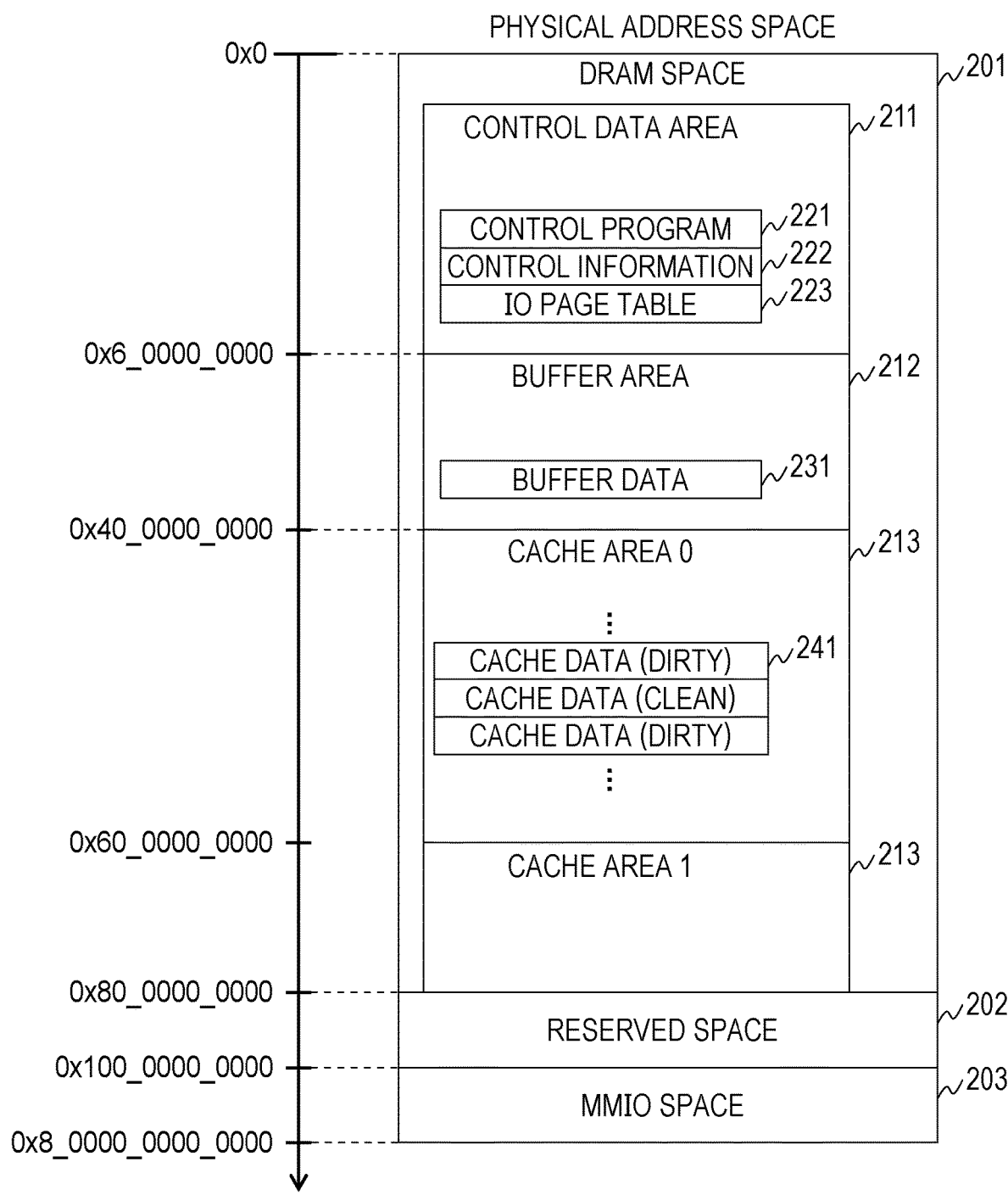
FIG. 2 is a diagram illustrating a physical address space managed by a controller in the embodiment.

FIG. 2 is a diagram illustrating a physical address space managed by the controller 120 in the embodiment.

The physical address space includes a DRAM space 201, a reserved space 202, and an MMIO space 203.

The reserved space 202 is an address space to which an access is disable. The MMIO space 203 is an address space used for accessing an IIO device. The controller 120 manages to prohibit an access (writing) from the storage drive 151 to the reserved space 202 and the MMIO space 203.

The DRAM space 201 is an address space used for accessing the memory 131. The DRAM space 201 includes address spaces on which a control data area 211, a buffer area 212, and a cache area 213 of the memory 131 are mapped.

The control data area 211 is a storage area in which a program and information for controlling the storage system 100 are stored. A control program 221, control information 222, the IO page table 223, and the like are stored in the control data area 211.

The control program 221 is a program to realize a control function (storage control unit) of the storage system 100.

The control information 222 is information for controlling the storage system 100. The control information 222 includes a cache directory, data for managing buffer data 231, data for managing cache data 241, commands for controlling various devices, and data shared between the controllers 120, for example. The control information 222 includes data for managing a RAID configuration and information for managing a correspondence relation between the storage area provided to the host terminal 104 and the storage drive 151.

In the embodiment, the cache directory is managed in a unit referred to as a segment having a size of 64 kB. Specifically, the cache directory is managed as a list of a segment status, LRU information, MRU information, a bitmap indicating whether the segment is in any of a dirty state and a clean state, a physical address of the memory 131, and the like.

The IO page table 223 is a table used when the IOMMU 141 controls an access to the memory 131 by the storage drive 151. In the embodiment, one IO page table 223 is generated for each NVMe drive. A plurality of IO page tables 223 is managed by IO page-table management information 500 (see FIG. 5). Details of the IO page-table management information 500 and the IO page table 223 will be described with reference to FIG. 5.

The core 140 is capable of setting and updating the IOMMU 141. The core 140 operates a register of the IOMMU 141 to allow the IO page table 223 held by the IOMMU 141 to be invalid and allow the IO page table 223 to be cached.

The buffer area 212 is a storage area in which the buffer data 231 is stored. The buffer data 231 is discarded after IO processing is completed. The controller 120 manages to permit an access (writing) from the storage drive 151 to the buffer area 212.

The cache area 213 is a storage area in which the cache data 241 is stored. A dirty cache data 241 and a clean cache data 241 are provided in the cache data 241.

The dirty cache data 241 is data provided only in the memory 131. The clean cache data 241 is data destaged to the storage drive 151. In a case where the dirty cache data 241 is destaged to the storage drive 151, the dirty cache data 241 is managed as the clean cache data 241.

In a case where failure occurs in the controller of the storage system 100, the clean cache data 241 can be restored by being read from the storage drive 151. However, it is difficult to restore the dirty cache data 241 from the controller in which failure occurs. Thus, the dirty cache data 241 is made redundant between the plurality of controllers 120. After being destaged to the storage drive 151, the dirty cache data 241 eliminates the redundancy configuration to cause the state of the cache data to be transitioned from the dirty state to the clean state.

In the embodiment, a plurality of cache areas 213 having different access attributes is set for each NVMe drive. Specifically, a cache area 213 in which data can be written and a cache area 213 in which data cannot be written are set for one storage drive 151. In the following descriptions, the cache area 213 in which data can be written is described as a permitted cache area 213, and the cache area 213 in which data cannot be written is described as a non-permitted cache area 213.

Thus, it is possible to prevent destruction of data by writing invalid data from the NVMe drive. It is possible to prevent destruction of data by writing invalid data from another NVMe drive since distributed permitted cache areas 213 set in NVMe drives are configured.

Next, information managed by the storage system 100 will be described with reference to FIGS. 3 to 5.

FIG. 3 is a diagram illustrating an example of storage-drive correspondence information 300 included in the control information 222 in the embodiment.

In the embodiment, the storage drive 151 is managed as a virtual storage drive in order to realize a flexible configuration of the RAID group and flexible maintenance (insertion and removal) of the storage drive 151.

The storage-drive correspondence information 300 is information for managing a correspondence relation between identification information of the storage drive 151 and identification information of the virtual storage drive. The storage-drive correspondence information 300 includes an entry configured by a physical drive ID 301 and a virtual drive ID 302. One entry is provided for one storage drive 151.

The physical drive ID 301 is a field in which the identification information of the storage drive 151 is stored. The virtual drive ID 302 is a field in which the identification information of the virtual storage drive is stored. The controller 120 performs various controls using the identification information stored in the virtual drive ID 302.

For simplifying descriptions, numbers are used as the identification information of the storage drive 151 and the virtual storage drive. However, generally, the identification information of the storage drive 151 and the virtual storage drive is configured with a PCI bus number, a device number, and a function number.

FIG. 4 is a diagram illustrating an example of area allocation management information 400 included in the control information 222 in the embodiment.

The area allocation management information 400 is information which is assigned to the storage drive 151 and is used for managing the permitted cache area 213. The area allocation management information 400 includes an entry configured by a virtual drive ID 401 and a cache area number 402. One entry is provided for one storage drive 151.

The virtual drive ID 401 is a field in which the identification information of a virtual storage drive corresponding to the storage drive 151 is stored. The cache area number 402 is a field in which identification information of a cache area 213 (permitted cache area 213) in which a virtual storage drive corresponding to the virtual drive ID 401 can directly write data is stored.

FIG. 5 is a diagram illustrating an example of a data structure of the IO page table 223 in the embodiment.

An IO page-table management information 500 includes an entry configured by a drive ID 501, a physical address 502, a page size 503, and a memory access attribute 504. One entry corresponds to one IO page table 223. In the embodiment, one IO page table 223 is provided for one storage drive 151 (virtual storage drive).

One entry includes a line in which information regarding an access control for a storage area (page) having a predetermined size is set. In the following descriptions, the line is described as a page table entry.

The drive ID 501 is a field in which identification information of a virtual storage drive corresponding to the storage drive 151 is stored.

The physical address 502 is a field in which a start physical address of a storage area (page) as an access target is stored. The page size 503 stores the size of the storage area (page) as the access target. The size can be set to various values, for example, 4 kB, 2 MB, and 1 GB, in accordance with the system.

The memory access attribute 504 is a field group in which access attributes for the storage area (page) as the access target are stored. The memory access attribute 504 includes a Read 505 and a Write 506.

The Read 505 is a field in which an attribute regarding reading of data from a storage area (page) as an access target is stored. Any of "Allowed" indicating that reading is possible and "Disallowed" indicating that reading is not possible is stored in the Read 505.

The Write 506 is a field in which an attribute regarding writing of data into a storage area (page) as an access target is stored. Any of "Allowed" indicating that writing is possible and "Disallowed" indicating that writing is not possible is stored in the Write 506.

In a case of a storage system 100 in which an NVMe drive is not installed, only one IO page table 223 is generated. In this case, the drive ID 501 in the entry is a blank.

Next, details of processing performed in the computer system will be described. Firstly, processing relating to registration and update of the IO page table 223 will be described with reference to FIGS. 6 to 11.

Figure 6:
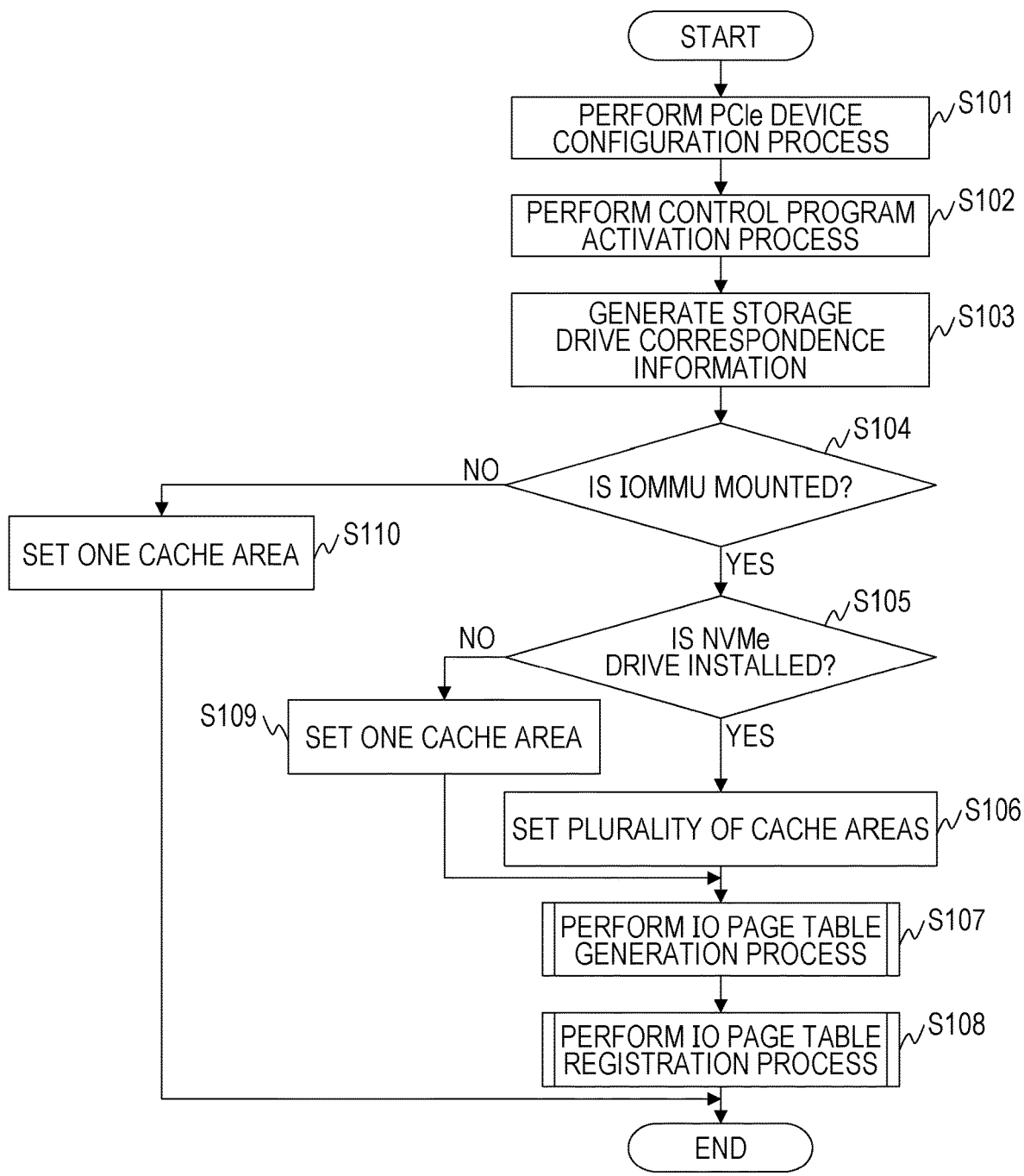
FIG. 6 is a flowchart illustrating an example of initial setting processing performed by a storage system in the embodiment.

FIG. 6 is a flowchart illustrating an example of initial setting processing performed by the storage system 100 in the embodiment.

The initial setting processing illustrated in FIG. 6 is performed when the storage system 100 activates or reactivates. The initial setting processing is performed by the core 140 of at least one controller 120. As necessary, the cores 140 of the plurality of controllers 120 may cooperate with each other.

The core 140 performs a PCIe device configuration process for initializing a PCIe device (Step S101). The PCIe device configuration process is the well-known technique, and thus detailed descriptions thereof will be omitted. An initialization process of another kind of hardware in the storage system 100 will be omitted.

Then, the core 140 performs a control program activation process (Step S102). The control program start process is a so-called activation process of an operating system (OS). After the control program start process, a process is performed by the control program. The control program activation process is the well-known technique, and thus detailed descriptions thereof will be omitted.

Then, the core 140 generates storage-drive correspondence information 300 (Step S103).

Specifically, the core 140 adds entries corresponding to the number of storage drives 151 to the storage-drive correspondence information 300 and sets identification information of each storage drive 151 in the physical drive ID 301 of each entry. The core 140 performs association between the storage drive 151 and a virtual storage drive and sets identification information of the virtual storage drive in the virtual drive ID 302 in each entry based on the result.

The core 140 determines whether or not an IOMMU 141 is mounted in the CPU 130 (Step S104).

In a case where it is determined that the IOMMU 141 is not mounted in the CPU 130, the core 140 sets one cache area 213 in the memory 131 (Step S110). Then, the core 140 ends the initial setting processing. At this time, the core 140 also sets a buffer area 212.

In a case where it is determined that the IOMMU 141 is mounted in the CPU 130, the core 140 determines whether or not an NVMe drive is installed (Step S105).

In a case where it is determined that the NVMe drive is not installed, the core 140 sets one cache area 213 in the memory 131 of each controller 120 (Step S109). At this time, the core 140 also sets a buffer area 212 in each controller 120. Then, the core 140 causes the process to proceed to Step S107.

In a case where it is determined that the NVMe drive is installed, the core 140 sets a plurality of cache areas 213 in the memory 131 of each controller 120 (Step S106). At this time, the core 140 also sets a buffer area 212 in each controller 120. Then, the core 140 causes the process to proceed to Step S107.

In Step S107, the core 140 performs an IO page table generation process (Step S107). Details of the IO page table generation process will be described with reference to FIGS. 7A to 7C.

Then, the core 140 performs an IO page table registration process (Step S108). Then, the core 140 ends the initial setting processing. Details of the IO page table registration process will be described with reference to FIG. 11.

Figure 7A:
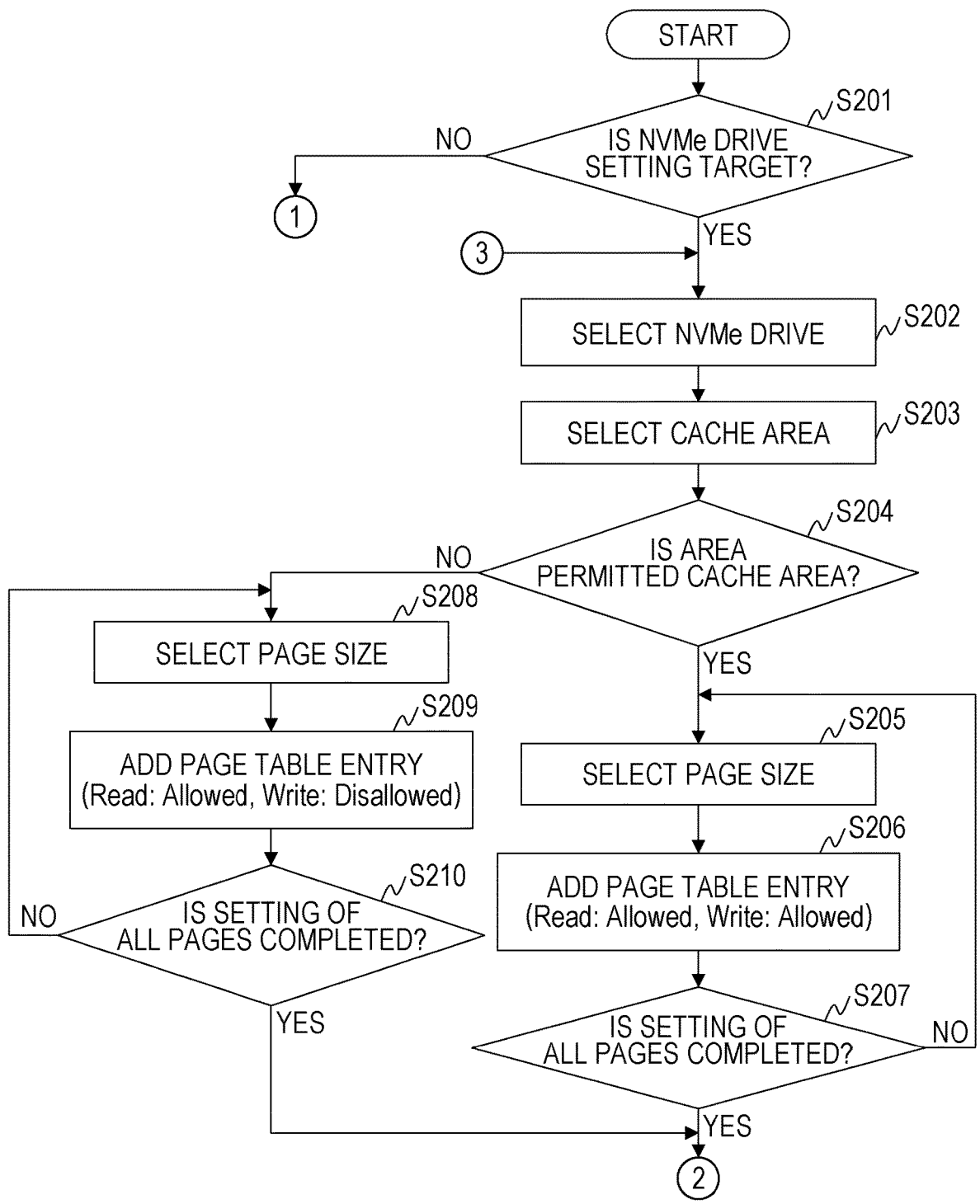
FIG. 7A is a flowchart illustrating an example of an IO page table generation process performed by the storage system in the embodiment.
Figure 7B:
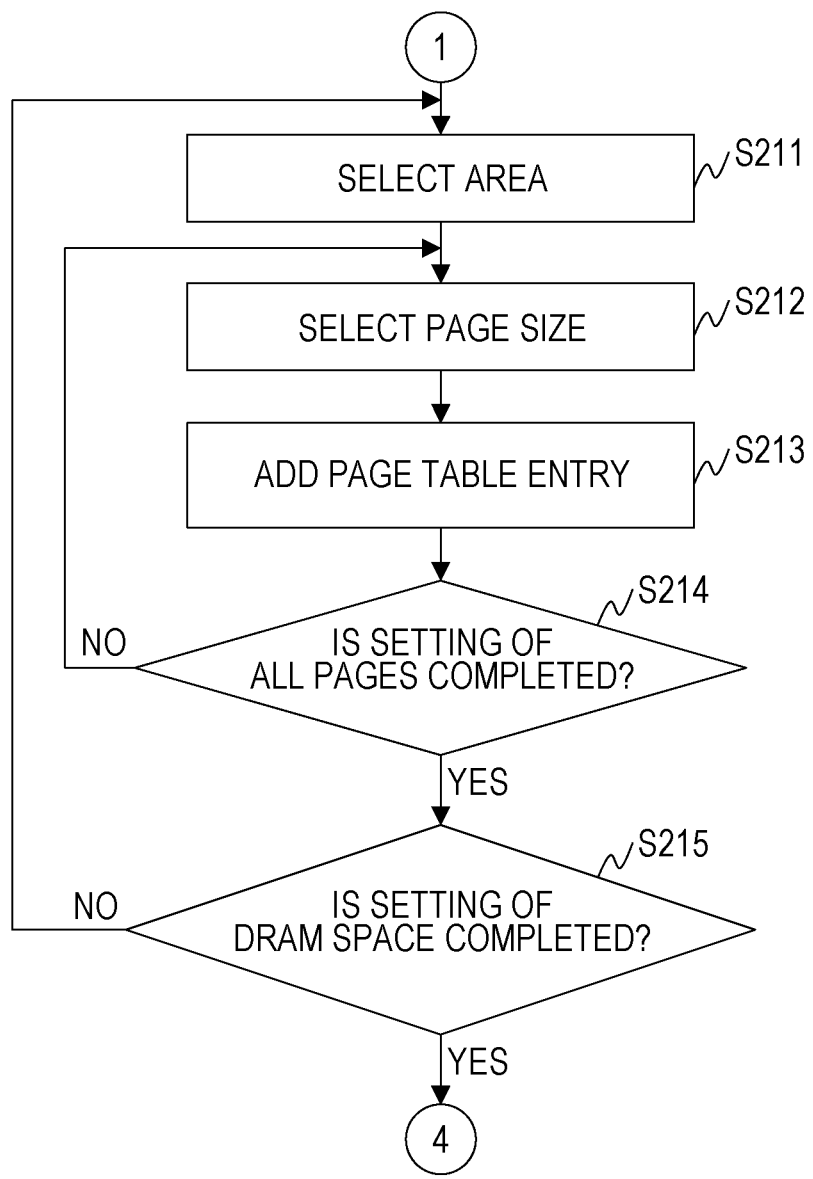
FIG. 7B is a flowchart illustrating the example of the IO page table generation process performed by the storage system in the embodiment.
Figure 7C:
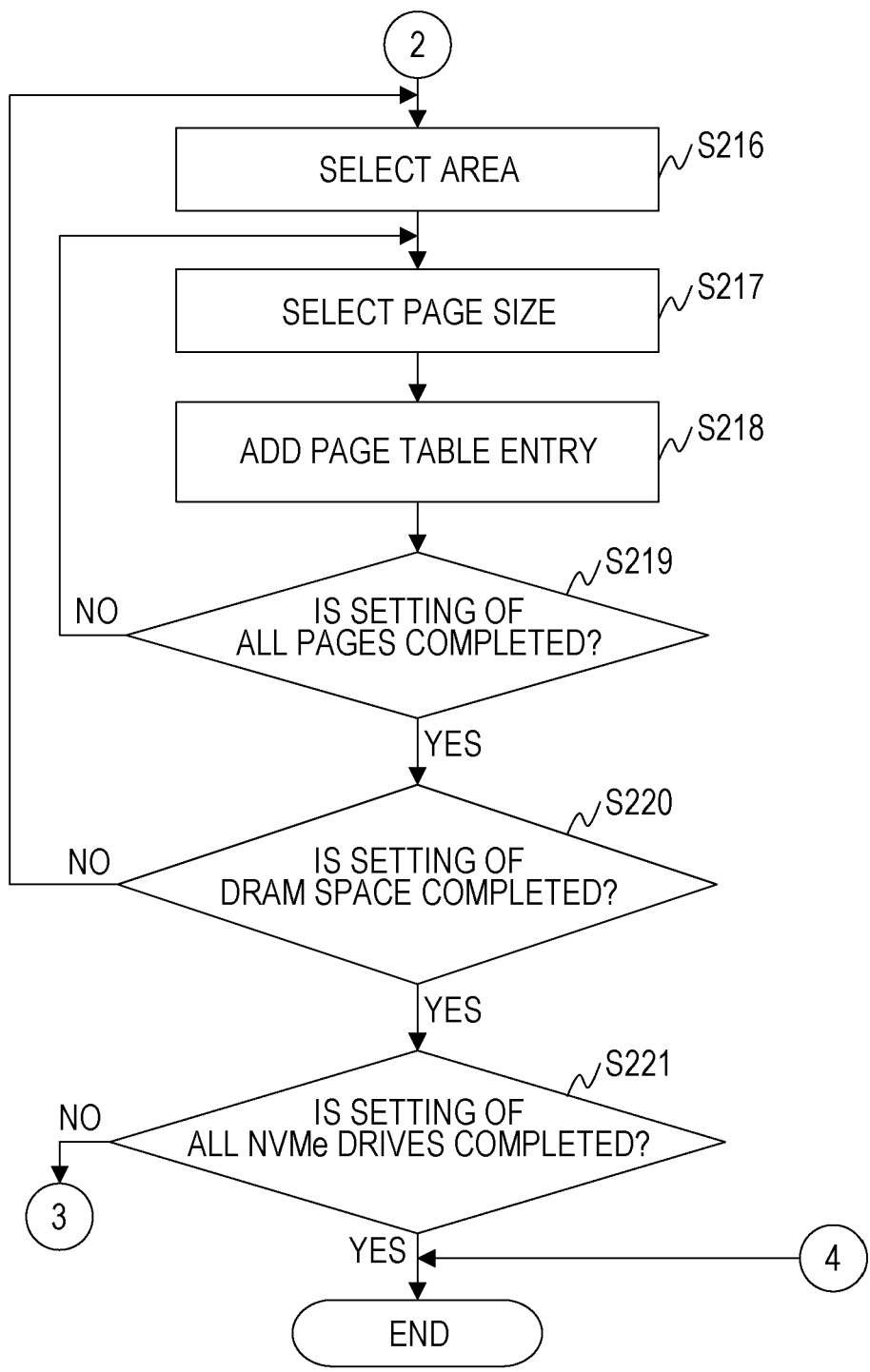
FIG. 7C is a flowchart illustrating the example of the IO page table generation process performed by the storage system in the embodiment.

FIGS. 7A to 7C are flowcharts illustrating an example of the IO page table generation process performed by the storage system 100 in the embodiment.

The IO page table generation process is performed for each controller 120.

The core 140 determines whether or not the NVMe drive is a setting target (Step S201). That is, it is determined whether or not the process is the IO page table generation process performed after any process of Step S106 and Step S109.

In a case where it is determined that the NVMe drive is not the setting target, the core 140 selects a target area (control data area 211, buffer area 212, or cache area 213) from the DRAM space 201 (Step S211). At this time, the core 140 adds an entry to IO page-table management information 500. The drive ID 501 maintains a blank.

Then, the core 140 sets a head address of a target page and selects a page size (Step S212).

The core 140 adds a page table entry to the IO page table 223 (Step S213). Specifically, a process as follows is performed.

(A1) In a case where the target page is a page included in the control data area 211, the core 140 adds a line to the entry added to the IO page-table management information 500, sets the head address of the page in the physical address 502, and sets the selected page size in the page size 503. The core 140 sets "Disallowed" in each of the Read 505 and the Write 506.

(A2) In a case where the target page is a page included in the buffer area 212, the core 140 adds a line to the entry added to the IO page-table management information 500, sets the head address of the page in the physical address 502, and sets the selected page size in the page size 503. The core 140 sets "Allowed" in each of the Read 505 and the Write 506.

(A3) In a case where the target page is a page included in the cache area 213, the core 140 adds a line to the entry added to the IO page-table management information 500, sets the head address of the page in the physical address 502, and sets the selected page size in the page size 503. The core 140 sets "Allowed" in the Read 505 and sets "Disallowed" in the Write 506.

The above descriptions are made for the process of Step S213.

Then, the core 140 determines whether or not setting of all pages in the selected area is completed (Step S214).

In a case where it is determined that setting of all the pages in the selected area is not completed, the core 140 causes the process to return to Step S212 and performs the similar process.

In a case where it is determined that setting of all the pages in the selected area is completed, the core 140 determines whether or not setting of all areas in the DRAM space 201 is completed (Step S215).

In a case where it is determined that setting of all the areas in the DRAM space 201 is not completed, the core 140 causes the process to return to Step S211 and performs the similar process.

In a case where it is determined that setting of all the areas in the DRAM space 201 is completed, the core 140 ends the IO page table generation process.

In a case where it is determined, in Step S201, that the NVMe drive is the setting target, the core 140 selects a target NVMe drive (Step S202). At this time, the core 140 adds an entry to the IO page-table management information 500 and sets identification information of the NVMe drive in the drive ID 501 of the added entry.

Then, the core 140 selects a target cache area 213 from the DRAM space 201 (Step S203).

The core 140 determines whether or not the selected cache area 213 is a permitted cache area 213 (Step S204).

Specifically, the core 140 refers to the area allocation management information 400 and searches for an entry in which identification information of a virtual storage drive corresponding to the selected NVMe drive is set in the virtual drive ID 401. The core 140 determines whether or not the identification information set in the cache area number 402 of the searched entry coincides with the identification information of the selected cache area 213. In a case where pieces of identification information of the two cache areas 213 coincide with each other, the core 140 determines that the selected cache area 213 is the permitted cache area 213.

In a case where it is determined that the selected cache area 213 is the permitted cache area 213, the core 140 sets the head address of a target page and selects a page size (Step S205).

Then, the core 140 adds a page table entry to the IO page table 223 (Step S206).

Specifically, the core 140 adds a line to the entry added to the IO page-table management information 500, sets the head address of the page in the physical address 502, and sets the selected page size in the page size 503. The core 140 sets "Allowed" in each of the Read 505 and the Write 506.

Then, the core 140 determines whether or not setting of all pages in the selected cache area 213 is completed (Step S207).

In a case where it is determined that setting of all the pages in the selected cache area 213 is not completed, the core 140 causes the process to return to Step S205 and performs the similar process.

In a case where it is determined that setting of all the pages in the selected cache area 213 is completed, the core 140 causes the process to proceed to Step S216.

In a case where it is determined, in Step S204, that the selected cache area 213 is not the permitted cache area 213, the core 140 sets the head address of a target page and selects a page size (Step S208).

Then, the core 140 adds a page table entry to the IO page table 223 (Step S209).

Specifically, the core 140 adds a line to the entry added to the IO page-table management information 500, sets the head address of the page in the physical address 502, and sets the selected page size in the page size 503. The core 140 sets "Allowed" in the Read 505 and sets "Disallowed" in the Write 506.

Then, the core 140 determines whether or not setting of all pages in the selected cache area 213 is completed (Step S210).

In a case where it is determined that setting of all the pages in the selected cache area 213 is not completed, the core 140 causes the process to return to Step S208 and performs the similar process.

In a case where it is determined that setting of all the pages in the selected cache area 213 is completed, the core 140 causes the process to proceed to Step S216.

In Step S216, the core 140 selects a target area (control data area 211 or buffer area 212) from areas of the DRAM space 201 other than the cache area 213 (Step S216).

Then, the core 140 sets the head address of a target page and selects a page size (Step S217).

Then, the core 140 adds a page table entry to the IO page table 223 (Step S218). Specifically, a process as follows is performed.

(B1) In a case where the target page is a page included in the control data area 211, the core 140 adds a line to the entry added to the IO page-table management information 500, sets the head address of the page in the physical address 502, and sets the selected page size in the page size 503. The core 140 sets "Disallowed" in each of the Read 505 and the Write 506.

(B2) In a case where the target page is a page included in the buffer area 212, the core 140 adds a line to the entry added to the IO page-table management information 500, sets the head address of the page in the physical address 502, and sets the selected page size in the page size 503. The core 140 sets "Allowed" in each of the Read 505 and the Write 506.

The above descriptions are made for the process of Step S218.

Then, the core 140 determines whether or not setting of all pages in the selected area is completed (Step S219).

In a case where it is determined that setting of all the pages in the selected area is not completed, the core 140 causes the process to return to Step S217 and performs the similar process.

In a case where it is determined that setting of all the pages in the selected area is completed, the core 140 determines whether or not setting of all areas in the DRAM space 201 is completed (Step S220).

In a case where it is determined that setting of all the areas in the DRAM space 201 is not completed, the core 140 causes the process to return to Step S216 and performs the similar process.

In a case where it is determined that setting of all the areas in the DRAM space 201 is completed, the core 140 determines whether or not setting of all NVMe drives is completed.

In a case where it is determined that setting of all the NVMe drives is not completed, the core 140 causes the process to return to Step S202 and performs the similar process.

In a case where it is determined that setting of all the NVMe drives is completed, the core 140 ends the IO page table generation process.

As described above, in a case where the NVMe drives are installed in the storage system 100, the storage system 100 generates the IO page table 223 for each NVMe drive.

Figure 8:
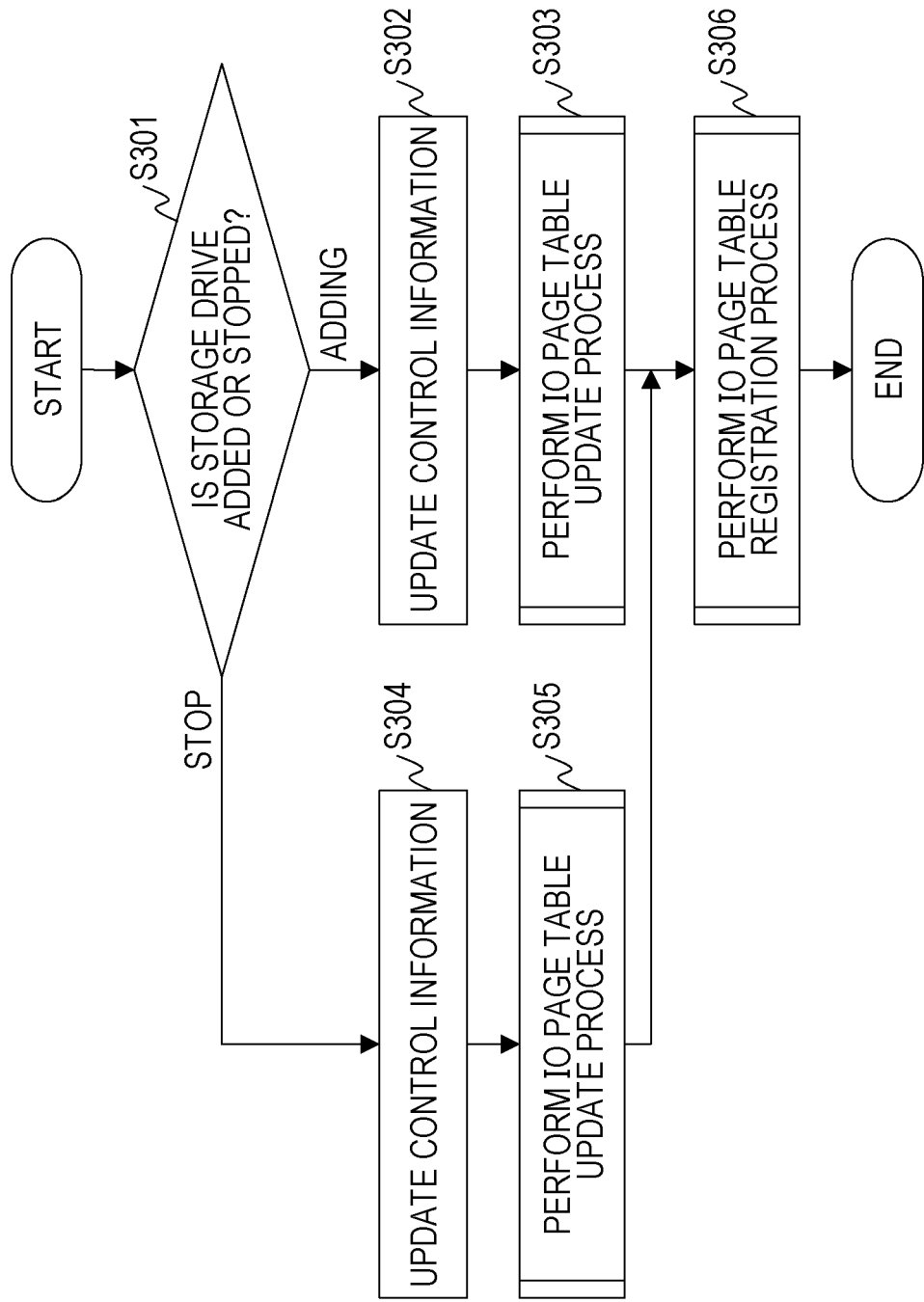
FIG. 8 is a flowchart illustrating an example of setting update processing performed by the storage system in the embodiment.

FIG. 8 is a flowchart illustrating an example of setting update processing performed by the storage system 100 in the embodiment.

The core 140 determines whether or not the storage drive 151 is stopped or a storage drive 151 is added (Step S301).

In a case where it is determined that the storage drive 151 is added, the core 140 updates the control information 222 (Step S302). Specifically, a process as follows is performed.

The core 140 associates a virtual storage drive with the storage drive 151. In a case where the storage drive 151 is an NVMe drive, the core 140 determines a permitted cache area 213 to be allocated to the NVMe drive.

The core 140 adds an entry to the storage-drive correspondence information 300, sets identification information of the NVMe drive in the physical drive ID 301 of the added entry, and sets identification information of the virtual storage drive in the virtual drive ID 302.

In a case where the storage drive 151 is the NVMe drive, the core 140 adds an entry to the area allocation management information 400, sets identification information of the virtual storage drive in the virtual drive ID 401 of the added entry, and sets identification information of the determined permitted cache area 213 in the cache area number 402. The above descriptions are made for the process of Step S302.

Then, the core 140 performs an IO page table update process (adding) (Step S303). Then, the core 140 causes the process to proceed to Step S306. Details of the IO page table update process (adding) will be described with reference to FIG. 9.

In a case where it is determined, in Step S301, that the storage drive 151 is stopped, the core 140 updates the control information 222 (Step S304). Specifically, a process as follows is performed.

The core 140 refers to the storage-drive correspondence information 300 and searches for an entry in which identification information of a virtual storage drive corresponding to the stopped storage drive 151 is set in the virtual drive ID 302. The core 140 deletes the searched entry.

In a case where the storage drive 151 is the NVMe drive, the core 140 refers to the area allocation management information 400, searches for an entry in which identification information of a virtual storage drive corresponding to the stopped storage drive 151 is set in the virtual drive ID 401, and deletes the searched entry. The above descriptions are made for the process of Step S304.

Then, the core 140 performs the IO page table update process (stop) (Step S305). Then, the core 140 causes the process to proceed to Step S306. Details of the IO page table update process (stop) will be described with reference to FIG. 10.

In Step S306, the core 140 performs the IO page table registration process (Step S306). Then, the core 140 ends the setting update processing. Details of the IO page table registration process will be described with reference to FIG. 11.

Figure 9:
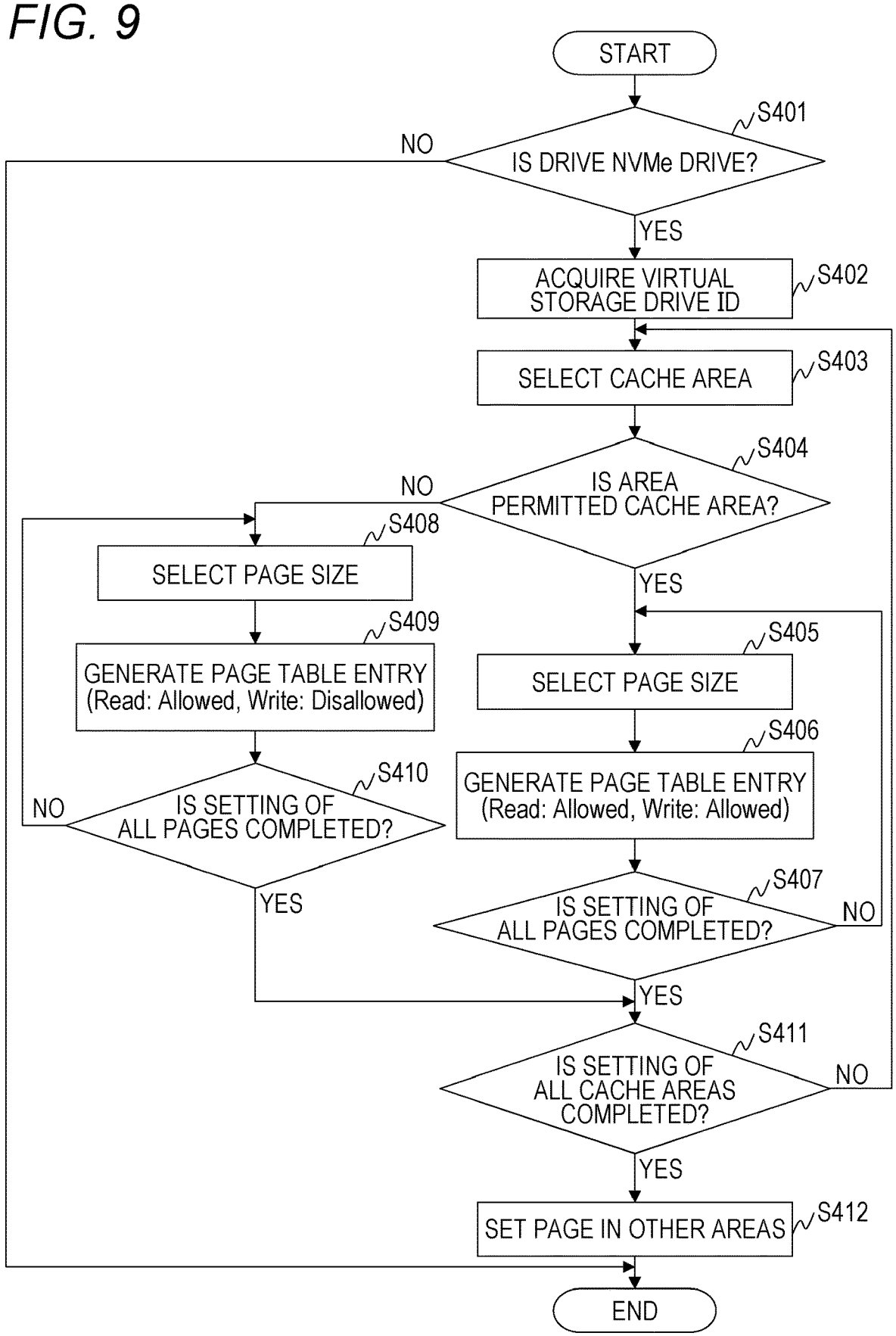
FIG. 9 is a flowchart illustrating an example of an IO page table update process (adding) performed by the storage system in the embodiment.

FIG. 9 is a flowchart illustrating an example of the IO page table update process (adding) performed by the storage system 100 in the embodiment.

The IO page table update process (adding) is performed for each controller 120.

The core 140 determines whether or not the added storage drive 151 is an NVMe drive (Step S401).

In a case where it is determined that the added storage drive 151 is not the NVMe drive, the core 140 ends the IO page table update process (adding).

In a case where it is determined that the added storage drive 151 is the NVMe drive, the core 140 acquires identification information of a virtual storage drive corresponding to the added NVMe drive (Step S402).

Then, the core 140 selects a target cache area 213 (Step S403) and determines whether or not the selected cache area 213 coincides with the permitted cache area 213 of the added NVMe drive (Step S404).

Specifically, the core 140 refers to the area allocation management information 400 and searches for an entry in which the acquired identification information of the virtual storage drive is set in the virtual drive ID 401. The core 140 determines whether or not the identification information set in the cache area number 402 of the searched entry coincides with the identification information of the selected cache area 213. In a case where pieces of identification information of the two cache areas 213 coincide with each other, the core 140 determines that the selected cache area 213 coincides with the permitted cache area 213 of the added NVMe drive.

In a case where it is determined that the selected cache area 213 coincides with the permitted cache area 213 of the added NVMe drive, the core 140 sets the head address of a target page and selects a page size (Step S405).

Then, the core 140 generates a page table entry corresponding to the page (Step S406). Specifically, a process as follows is performed.

The core 140 generates an entry corresponding to the IO page table 223. The core 140 sets identification information of a virtual storage drive corresponding to the added NVMe drive, in the drive ID 501 of the generated entry. In a case where the entry is already generated, this process is not performed.

The core 140 adds a line to the entry, sets the head address of the page in the physical address 502, and sets the selected page size in the page size 503. The core 140 sets "Allowed" in each of the Read 505 and the Write 506. The above descriptions are made for the process of Step S406.

Then, the core 140 determines whether or not setting of all pages in the selected cache area 213 is completed (Step S407).

In a case where it is determined that setting of all the pages in the selected cache area 213 is not completed, the core 140 causes the process to return to Step S405 and performs the similar process.

In a case where it is determined that setting of all the pages in the selected cache area 213 is not completed, the core 140 causes the process to proceed to Step S411.

In a case where it is determined, in Step S404, that the selected cache area 213 is not the permitted cache area 213 of the added NVMe drive, the core 140 sets the head address of a target page and selects a page size (Step S408).

Then, the core 140 generates a page table entry corresponding to the page (Step S409). Specifically, a process as follows is performed.

The core 140 generates an entry corresponding to the IO page table 223. The core 140 sets identification information of a virtual storage drive corresponding to the added NVMe drive, in the drive ID 501 of the generated entry. In a case where the entry is already generated, this process is not performed.

The core 140 adds a line to the entry, sets the head address of the page in the physical address 502, and sets the selected page size in the page size 503. The core 140 sets "Allowed" in the Read 505 and sets "Disallowed" in the Write 506. The above descriptions are made for the process of Step S409.

Then, the core 140 determines whether or not setting of all pages in the selected cache area 213 is completed (Step S410).

In a case where it is determined that setting of all the pages in the selected cache area 213 is not completed, the core 140 causes the process to return to Step S408 and performs the similar process.

In a case where it is determined that setting of all the pages in the selected cache area 213 is not completed, the core 140 causes the process to proceed to Step S411.

In Step S411, the core 140 determines whether or not setting of all the cache areas 213 is completed (Step S411).

In a case where it is determined that setting of all the cache areas 213 is not completed, the core 140 causes the process to return to Step S403 and performs the similar process.

In a case where it is determined that setting of all the cache areas 213 is completed, the core 140 sets a page in the area other than the cache area 213 (Step S412), and then ends the IO page table update process (adding). Specifically, the processes of Step S211 to Step S214 are performed on each area.

A new IO page table 223 is generated by the above processes. The process of Step S412 may not be performed.

Figure 10:
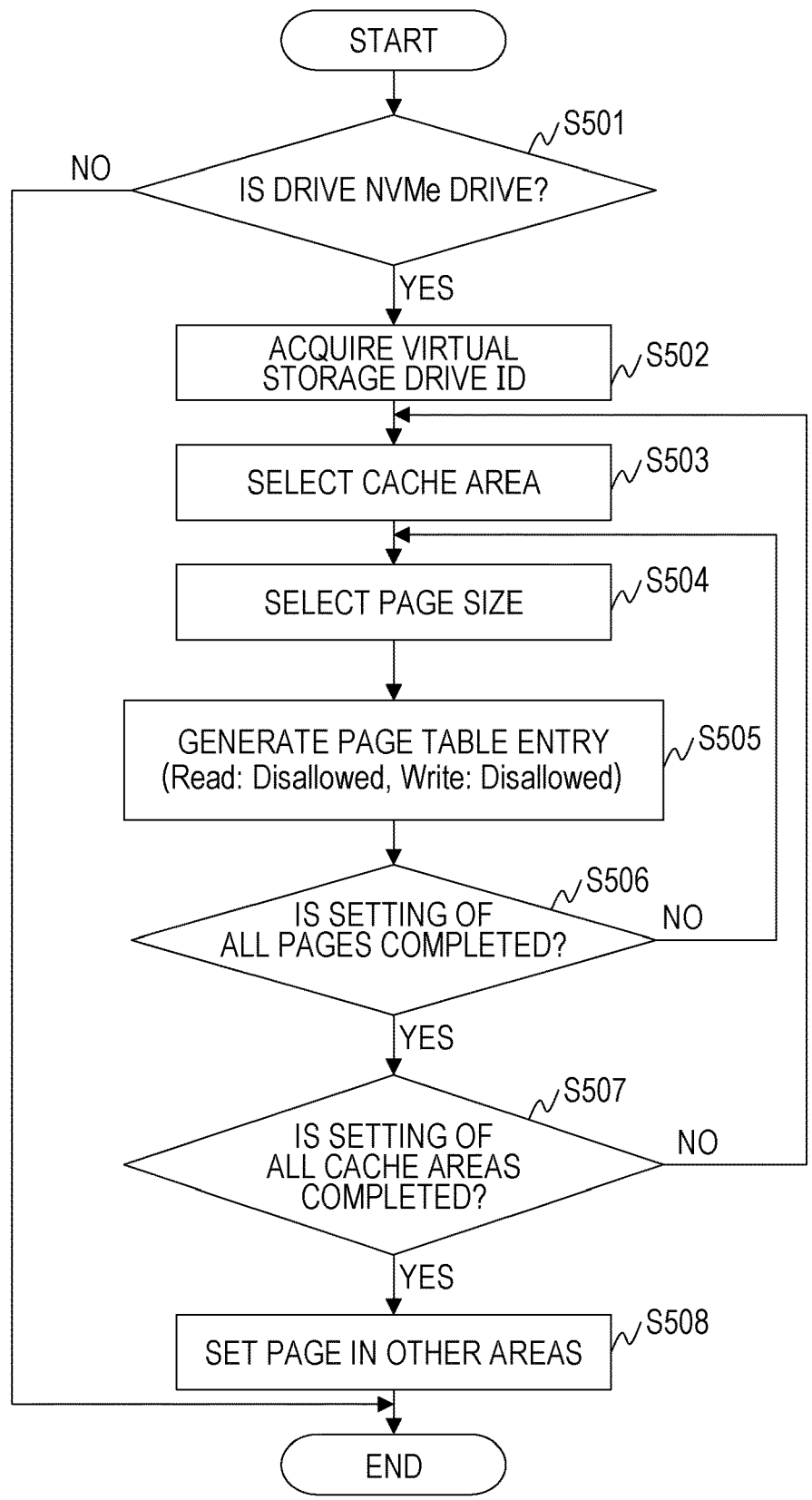
FIG. 10 is a flowchart illustrating an example of the IO page table update process (stop) performed by the storage system in the embodiment.

FIG. 10 is a flowchart illustrating an example of the IO page table update process (stop) performed by the storage system 100 in the embodiment.

The IO page table update process (stop) is performed for each controller 120.

The core 140 determines whether or not the stopped storage drive 151 is an NVMe drive (Step S501).

In a case where it is determined that the stopped storage drive 151 is not the NVMe drive, the core 140 ends the IO page table update process (stop).

In a case where it is determined that the stopped storage drive 151 is the NVMe drive, the core 140 acquires identification information of a virtual storage drive corresponding to the stopped NVMe drive (Step S502).

Then, the core 140 selects a target cache area 213 (Step S503).

Then, the core 140 sets the head address of a target page and selects a page size (Step S504).

Then, the core 140 generates a page table entry corresponding to the page (Step S505). Specifically, a process as follows is performed.

The core 140 generates an entry corresponding to the IO page table 223. The core 140 sets identification information of a virtual storage drive corresponding to the stopped NVMe drive, in the drive ID 501 of the generated entry. In a case where the entry is already generated, this process is not performed.

The core 140 adds a line to the entry, sets the head address of the page in the physical address 502, and sets the selected page size in the page size 503. The core 140 sets "Disallowed" in each of the Read 505 and the Write 506. The above descriptions are made for the process of Step S505.

Then, the core 140 determines whether or not setting of all pages in the selected cache area 213 is completed (Step S506).

In a case where it is determined that setting of all the pages in the selected cache area 213 is not completed, the core 140 causes the process to return to Step S504 and performs the similar process.

In a case where it is determined that setting of all the pages in the selected cache area 213 is completed, the core 140 determines whether or not setting of all the cache areas 213 is completed (Step S507).

In a case where it is determined that setting of all the cache areas is not completed, the core 140 causes the process to return to Step S503 and performs the similar process.

In a case where it is determined that setting of all the cache areas is completed, the core 140 sets a page in the area other than the cache area 213 (Step S508), and then ends the IO page table update process (stop). Specifically, the processes of Step S211 to Step S214 are performed on each area.

The process of Step S508 may not be performed.

Figure 11:
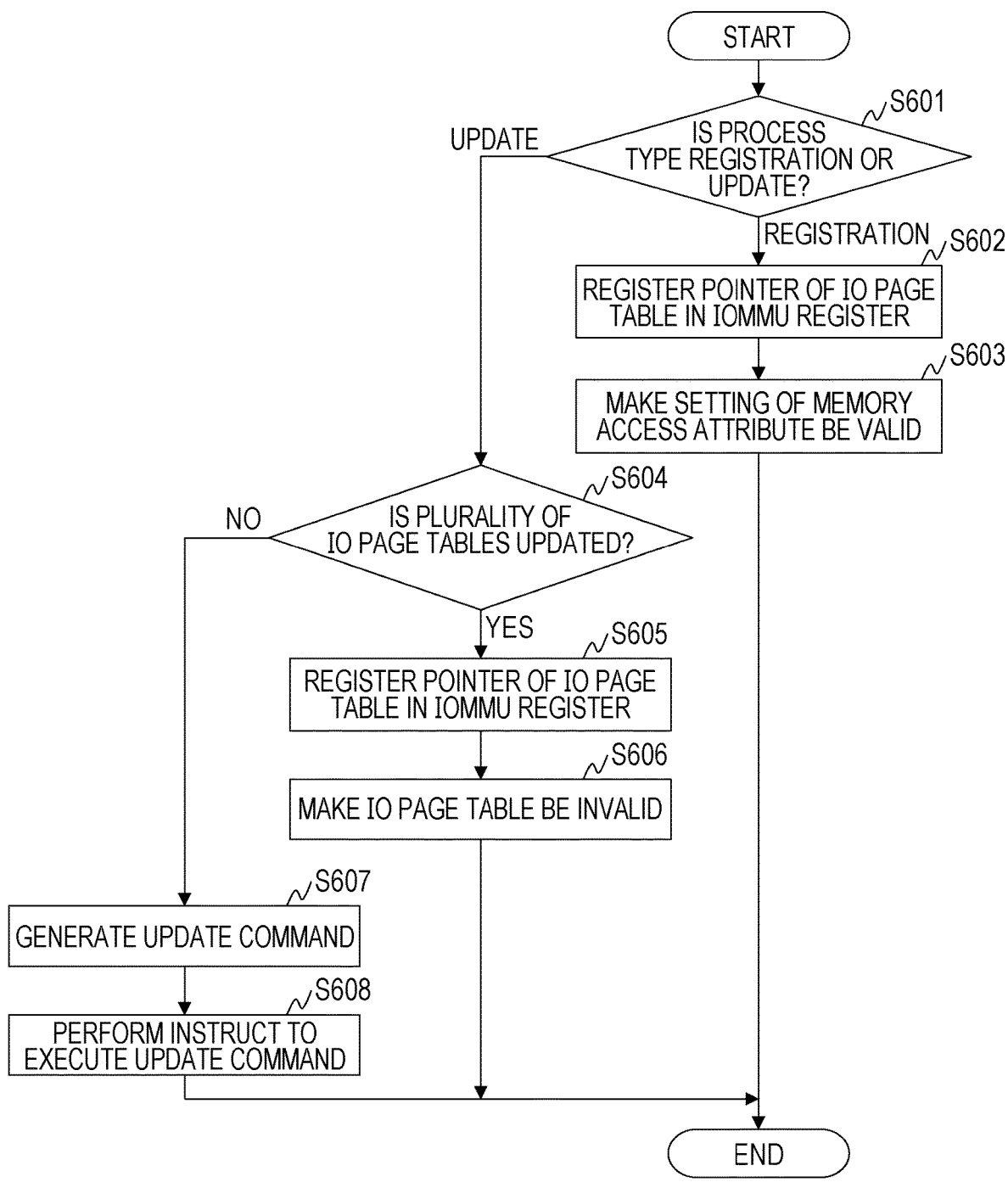
FIG. 11 is a flowchart illustrating an example of an IO page table registration process performed by the storage system in the embodiment.

FIG. 11 is a flowchart illustrating an example of the IO page table registration process performed by the storage system 100 in the embodiment.

The IO page table registration process is performed for each controller 120.

The core 140 determines whether or not a process type is any of registration and update of the IO page table 223 (Step S601).

In a case where it is determined that the process type is registration of the IO page table 223, the core 140 sets a pointer of the IO page table 223 in an IOMMU register (Step S602). That is, setting used when the IOMMU 141 reads the IO page table 223 is performed.

Then, the core 140 operates the IOMMU register to make setting of a memory access attribute (memory access authorization) be valid (Step S603). Then, the core 140 ends the IO page table registration process.

Specifically, the core 140 causes the IOMMU 141 to read the IO page table 223.

In a case where it is determined, in Step S601, that the process type is update of the IO page table 223, the core 140 determines whether or not a plurality of IO page tables 223 is updated (Step S604).

In a case where it is determined that the plurality of IO page tables 223 is updated, the core 140 sets a pointer of the IO page table 223 in the IOMMU register of a new IO page table 223 (Step S605).

Then, the core 140 operates the IOMMU register to make the currently used IO page table 223 be invalid (Step S606). At this time, the new IO page table 223 is read in the IOMMU register. Then, the core 140 ends the IO page table registration process.

In a case where update of the plurality of IO page tables 223 is not performed, the core 140 generates a command to update the IO page table 223 (Step S607).

The command includes identification information of the NVMe drive, a pointer of the IO page table 223 to be updated, and information indicating a range and the like of an update target.

The core 140 updates the specific IO page table 223 by operating the IOMMU register to cause the IOMMU 141 to execute the generated command (Step S608). Then, the core 140 ends the IO page table registration process.

The update can be performed in a unit of a page table entry. In this case, a process as follows is performed.

The core 140 specifies the IO page table 223 as the update target, based on the identification information of the NVMe drive. The core 140 generates a command to update a page table entry corresponding to the cache area 213 of the specified IO page table 223. The core 140 operates the IOMMU register to cause the IOMMU 141 to execute the generated command.

Next, IO processing will be described with reference to FIGS. 12 to 15C. It is assumed that the storage drive 151 as a target of IO processing is an NVMe drive.

Figure 12:
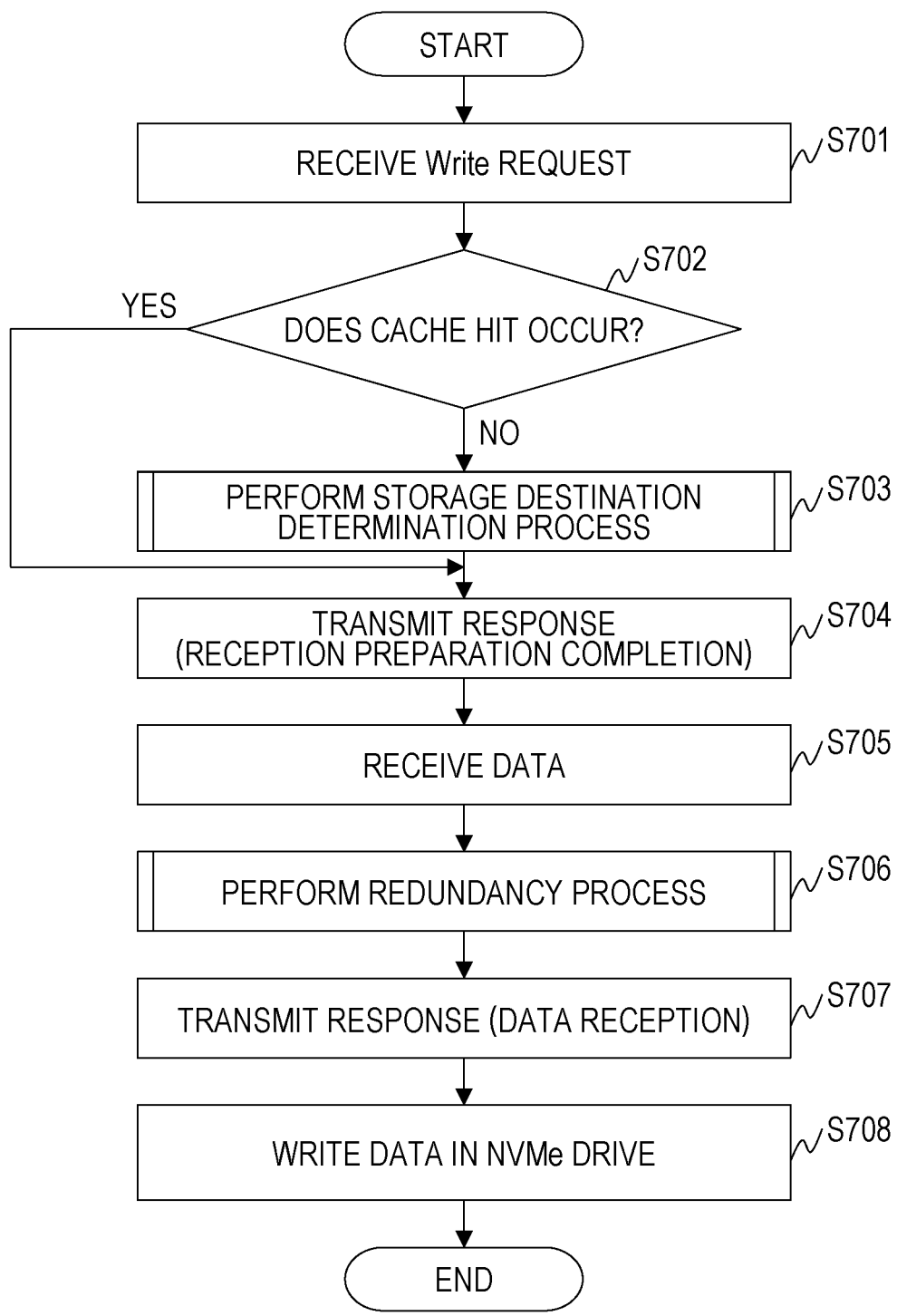
FIG. 12 is a flowchart illustrating IO processing performed in a case where the storage system in the embodiment receives a Write request.

FIG. 12 is a flowchart illustrating IO processing performed in a case where the storage system 100 in the embodiment receives a Write request.

In a case of receiving a Write request from the host terminal 104 (Step S701), the core 140 of one controller 120 determines whether or not cache hit occurs (Step S702).

Specifically, the core 140 determines whether or not data as a target of the Write request is provided in the cache area 213, by referring to the cache directory.

The Write request includes a data length, identification information of a storage area (LU) in which data is to be written, and the like. The core 140 can specify an NVMe drive in which data is to be written, based on the control information 222 and information included in the Write request.

In a case where it is determined that cache hit has occurred, the core 140 causes the process to proceed to Step S704.

In a case where it is determined that cache hit does not occur, the core 140 performs a storage destination determination process (Step S703) and then causes the process to proceed to Step S704. Details of the storage destination determination process will be described with reference to FIG. 13.

In Step S704, the core 140 transmits a response for a notification indicating that preparation for receiving write data is completed, to the host terminal 104 (Step S704).

In a case where the core 140 receives write data from the host terminal 104 (Step S705), the core 140 performs a redundancy process (Step S706). In the redundancy process, write data is stored in a state of being redundant on the memory 131. Details of the redundancy process will be described with reference to FIGS. 14A and 14B.

Then, the core 140 transmits a response for a notification indicating that receiving of the write data is completed, to the host terminal 104 (Step S707).

The core 140 writes the write data into the NVMe drive (storage drive 151) (Step S708), and then ends the IO processing.

For example, in a case where the write data is stored in the permitted cache area 213 of a controller 120 including the core 140, the core 140 writes the write data into the NVMe drive. In a case where the write data is stored in the non-permitted cache area 213 of a controller 120 including the core 140, the core 140 transmits a write request of data to another controller 120.

Figure 13:
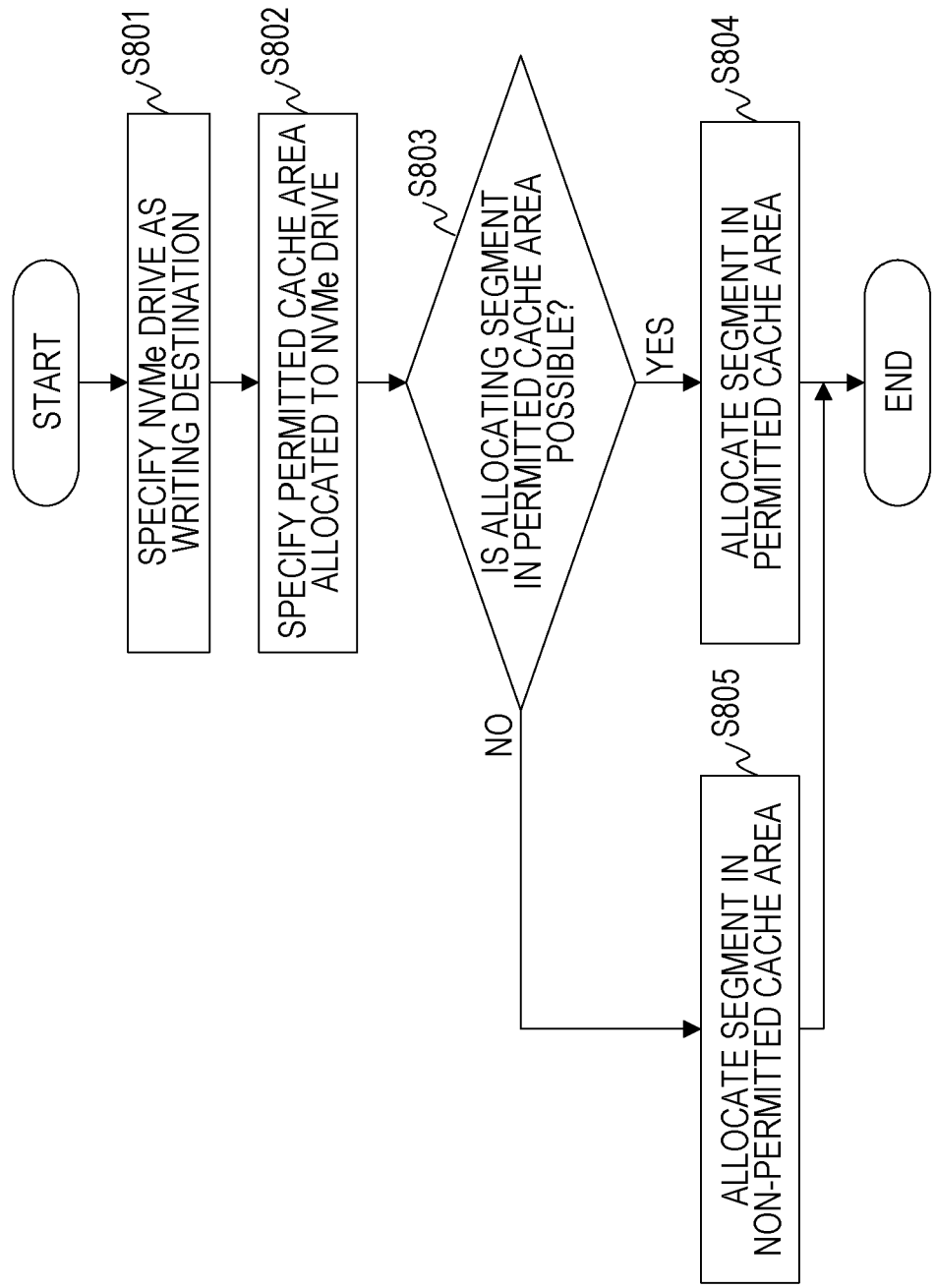
FIG. 13 is a flowchart illustrating an example of a storage destination determination process performed by the storage system in the embodiment.

FIG. 13 is a flowchart illustrating an example of the storage destination determination process performed by the storage system 100 in the embodiment.

The storage destination determination process is performed by the core 140 of the controller 120 which has received the Write request.

The core 140 specifies an NVMe drive as a writing destination of the write data, based on the control information 222 and the information included in the Write request (Step S801).

Then, the core 140 specifies a permitted cache area 213 allocated to the specified NVMe drive (Step S802).

Specifically, the core 140 refers to the area allocation management information 400 and searches for an entry in which identification information of a virtual storage drive corresponding to the specified NVMe drive is set in the virtual drive ID 401. The core 140 acquires the cache area number 402 of the searched entry.

Then, the core 140 determines whether or not allocating a segment for storing write data, in the specified permitted cache area 213, is possible (Step S803).

In a case where it is determined that allocating the segment for storing write data, in the specified permitted cache area 213, is possible, the core 140 allocates the segment in the specified permitted cache area 213 (Step S804), and then ends the storage destination determination process. The core 140 allocates the segment in the permitted cache area 213 based on the known cache control algorithm.

In a case where it is determined that allocating the segment for storing write data, in the specified permitted cache area 213, is not possible, the core 140 allocates the segment in the non-permitted cache area 213 (Step S805), and then ends the storage destination determination process. The core 140 allocates the segment in the permitted cache area 213 based on the known cache control algorithm.

Figure 14A:
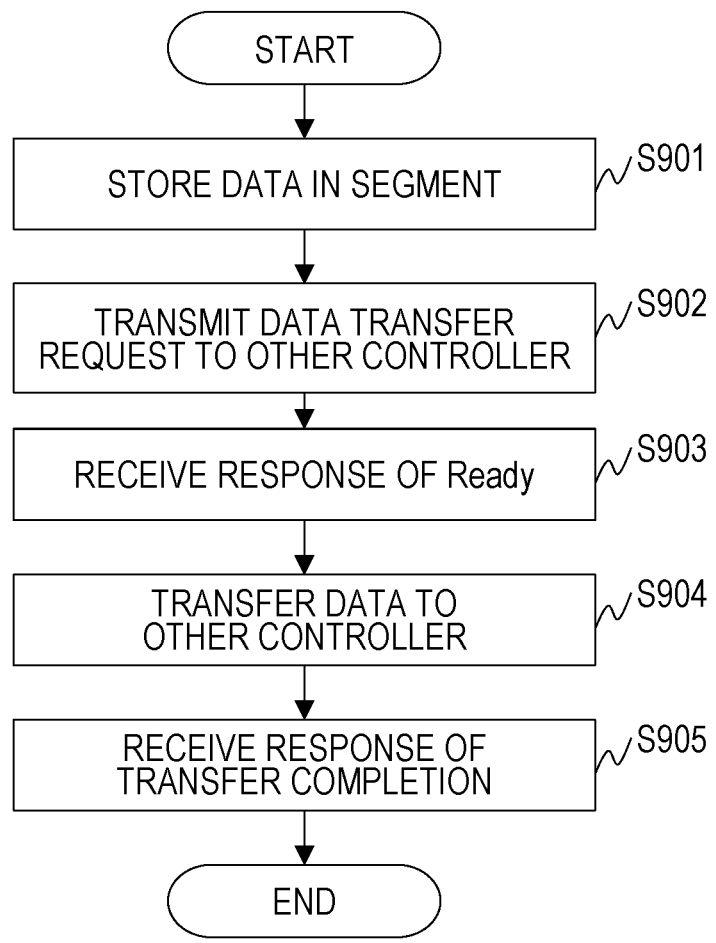
FIG. 14A is a flowchart illustrating an example of a redundancy process performed by the storage system in the embodiment.
Figure 14B:
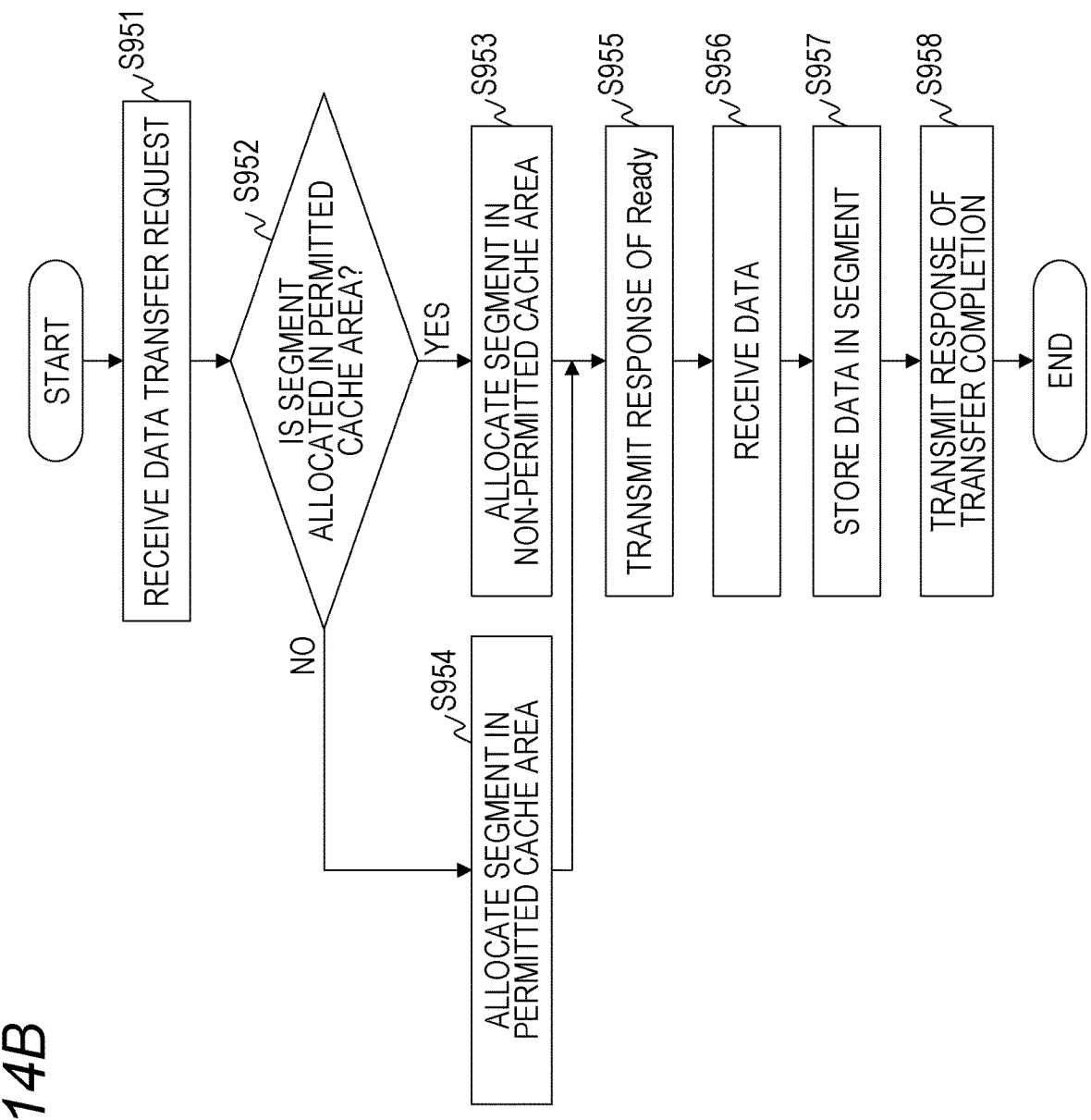
FIG. 14B is a flowchart illustrating another example of the redundancy process performed by the storage system in the embodiment.

FIGS. 14A and 14B are flowcharts illustrating examples of the redundancy process performed by the storage system 100 in the embodiment.

The redundancy process illustrated in FIG. 14A is performed by the core 140 of the controller 120 which has received the Write request. The redundancy process illustrated in FIG. 14B is performed by the core 140 of a controller 120 different from the controller 120 which has received the Write request. Firstly, the redundancy process illustrated in FIG. 14A will be described.

The core 140 stores the write data in the allocated segment (Step S901) and transmits a data transfer request to other controller 120 (Step S902). The data transfer request includes information of the cache area 213 in which the segment has been allocated.

In a case where the core 140 receives from the other controller 120 a response for a notification (Ready) indicating that preparation for data transfer is completed (Step S903), the core 140 transfers data to the other controller 120 (Step S904). Data transfer means may be the node interface 132, may be a CPU core 140 of the controller or a DMA (not illustrated) mounted in the CPU, and a DMA (not illustrated) of the storage drive 151 may be used.

In a case where the core 140 receives from the other controller 120 a response for a notification that transfer is completed (Step S905), the core 140 ends the redundancy process.

A timing at which the write data is stored in the segment can be randomly set. For example, in a case where the core 140 receives the response for the notification of Ready, or in a case where the core transfers data to other controller 120, the core 140 stores the write data in the segment.

Next, the redundancy process illustrated in FIG. 14B will be described.

In a case where the core 140 has received a data transfer request from other controller 120 (Step S951), the core 140 determines whether or not the cache area 213 in which the segment is allocated by the other controller 120 is the permitted cache area 213 (Step S952).

In a case where it is determined that the cache area 213 in which the segment is allocated by the other controller 120 is the permitted cache area 213, the core 140 allocates the segment in the non-permitted cache area 213 (Step S953), and then causes the process to proceed to Step S955. The core 140 allocates the segment in the non-permitted cache area 213 based on the known cache control algorithm.

In a case where it is determined that the cache area 213 in which the segment is allocated by the other controller 120 is not the permitted cache area 213, the core 140 allocates the segment in the permitted cache area 213 (Step S954), and then causes the process to proceed to Step S955. The core 140 allocates the segment in the permitted cache area 213 based on the known cache control algorithm.

In Step S955, the core 140 transmits a response for a notification of Ready to the other controller 120 (Step S955).

Then, the core 140 receives write data from the other controller 120 (Step S956) and stores the write data in the allocated segment (Step S957).

Then, the core 140 transmits a response for a notification that transfer is completed to the other controller 120 (Step S958). Then, the core 140 ends the redundancy process.

A timing at which the write data is stored in the segment can be randomly set. For example, the core 140 stores the write data in the segment after transmitting the response for the notification that the transfer is completed.

Figure 15A:
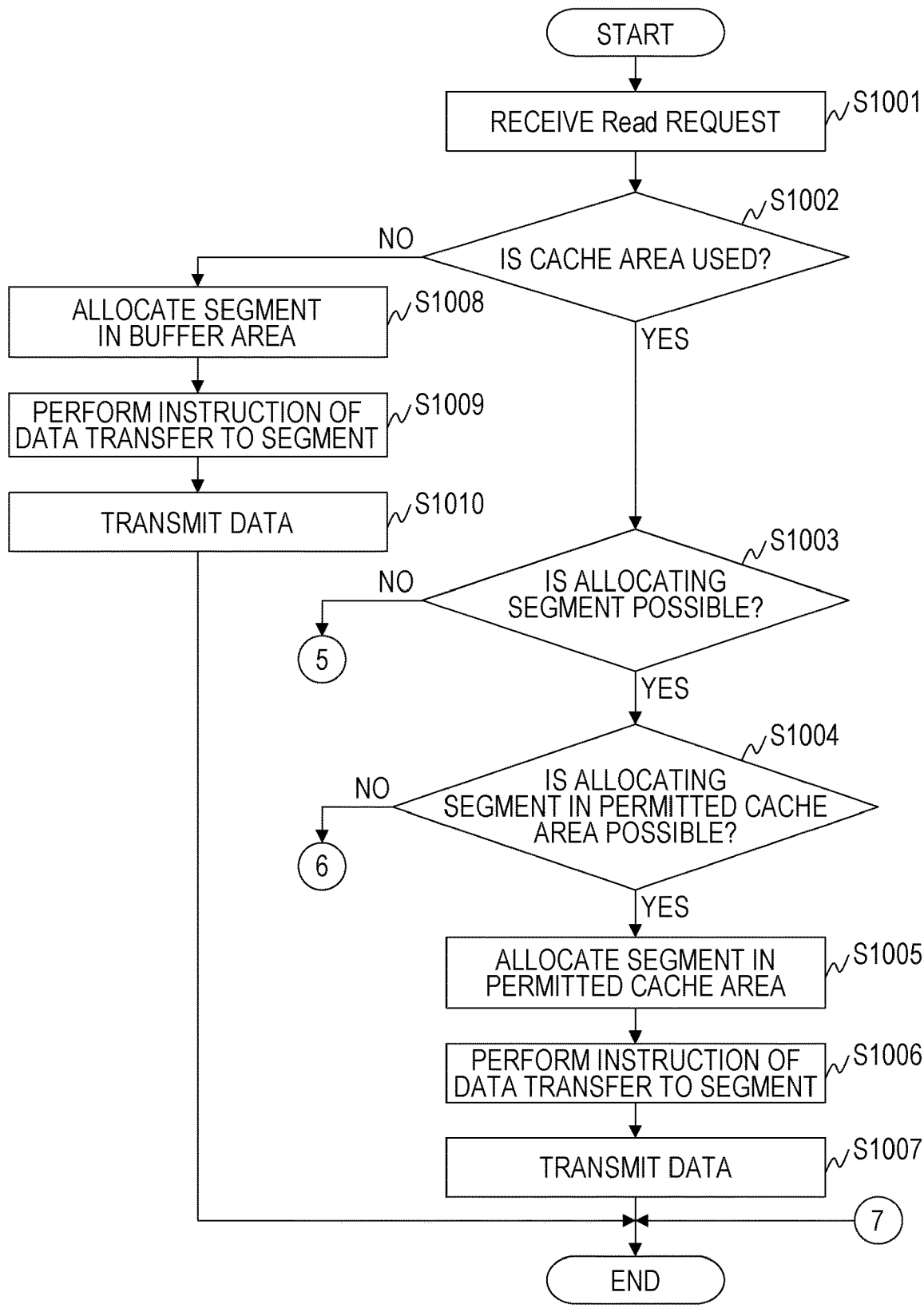
FIG. 15A is a flowchart illustrating the IO processing performed in a case where the storage system in the embodiment receives a Read request.
Figure 15B:
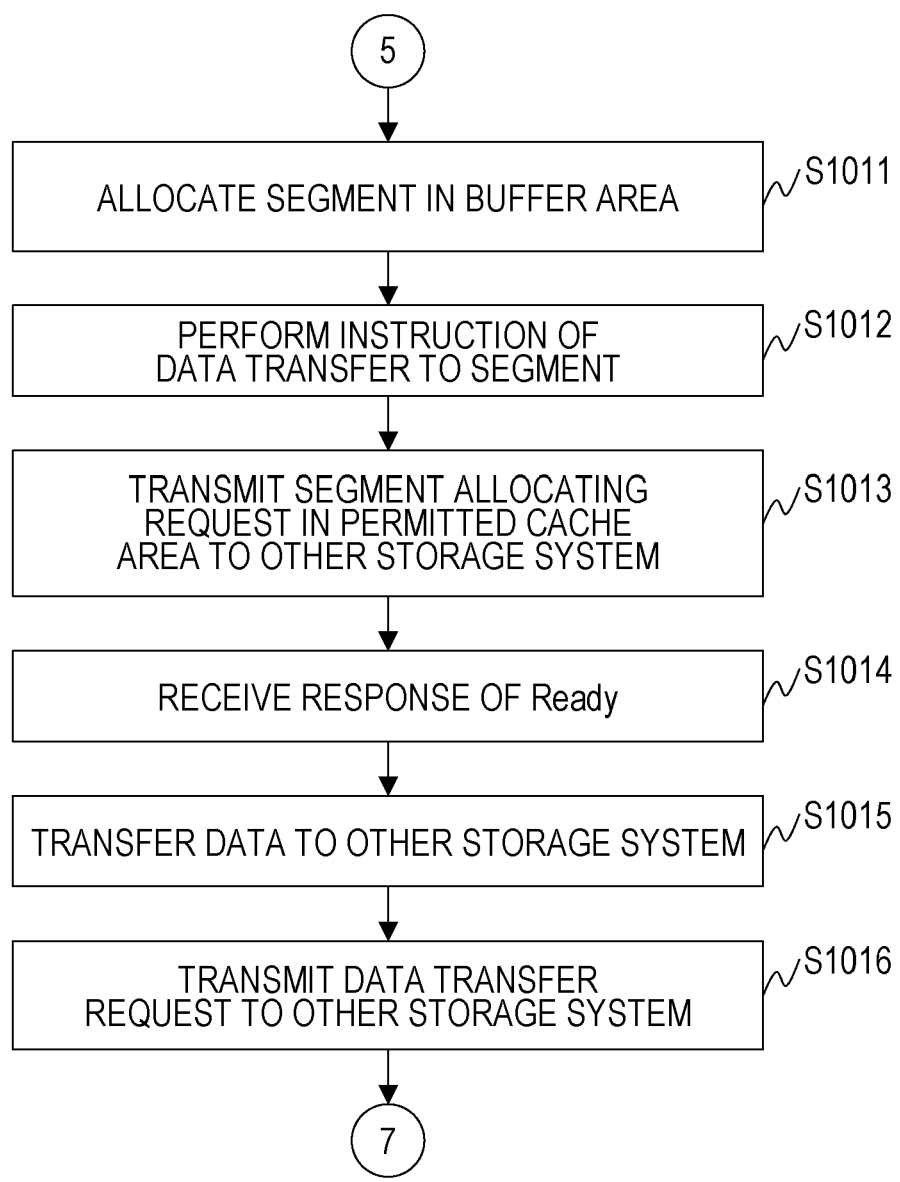
FIG. 15B is a flowchart illustrating the IO processing performed in a case where the storage system in the embodiment receives the Read request.
Figure 15C:
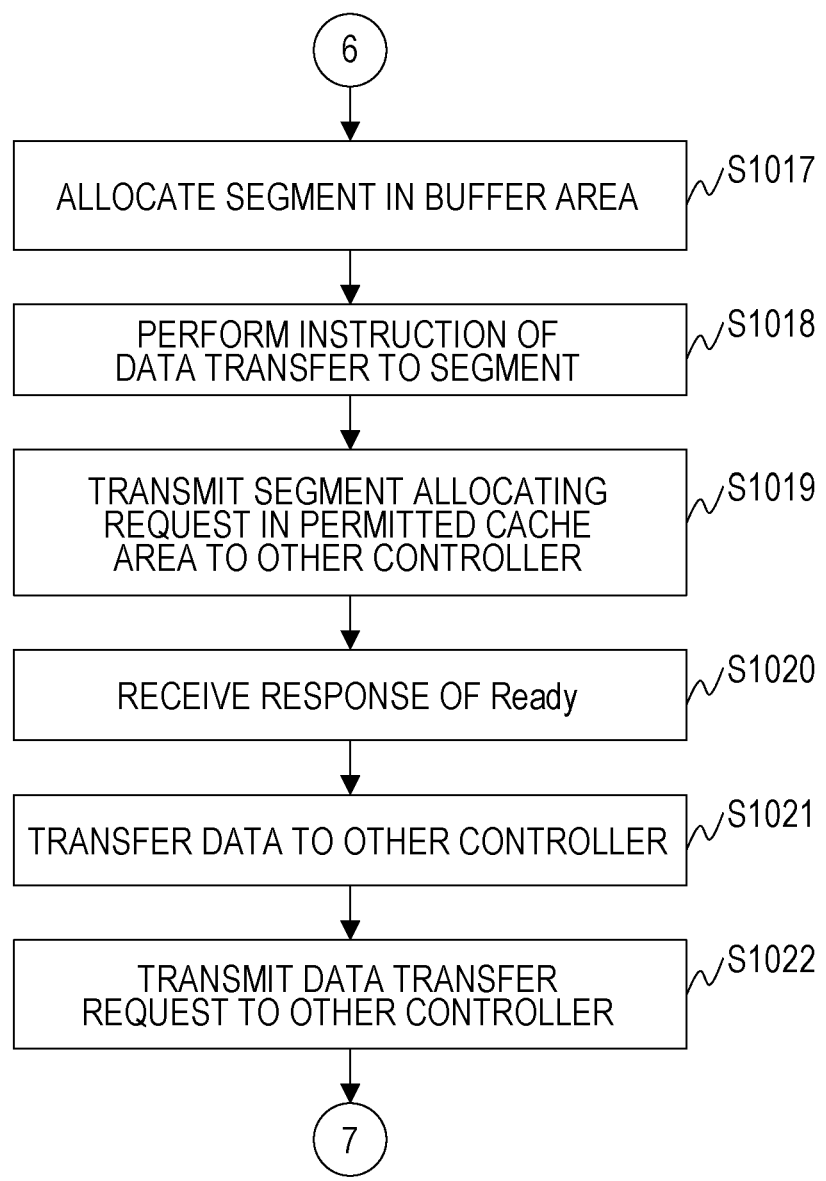
FIG. 15C is a flowchart illustrating the IO processing performed in a case where the storage system in the embodiment receives the Read request.

FIGS. 15A to 15C are flowcharts illustrating the IO processing performed in a case where the storage system 100 in the embodiment receives a Read request.

The core 140 of one controller 120 receives a Read request from the host terminal 104 (Step S1001). At this time, the core 140 specifies an NVMe drive in which read data is to be stored, based on the control information 222 and information included in the Read request.

The Read request includes a data length, identification information of a storage area (LU) in which read data is to be stored, and the like.

Then, the core 140 determines whether or not to use the cache area 213 (Step S1002).

For example, the core 140 determines whether or not the data is to be stored in the cache area 213, based on a read frequency of the read data. In a case of the high read frequency, it is possible to expect improvement of performance of the IO processing by storing the read data in the cache area 213. Therefore, in a case where the read frequency is more than a threshold, the core 140 determines to use the cache area 213. The above-described determination method is just an example, and the embodiment is not limited thereto.

In a case where it is determined not to use the cache area 213, the core 140 allocates a segment in the buffer area 212 (Step S1008), and instructs the NVMe drive to transfer the read data to the segment (Step S1009). The instruction includes information for reading the read data, information of the segment, and the like. The NVMe drive writes the read data into the segment of the buffer area 212 in accordance with the instruction.

Regarding a method of outputting the instruction to transfer data, various forms depending on designs and the like of the NVMe drive are considered. For example, the core 140 performs an instruction to transfer read data, by operating a register of the controller in the NVMe drive. The core 140 performs an instruction to transfer read data, by writing a command of a transfer instruction of the read data into an area on the memory 131, in which the controller of the NVMe drive performs polling.

Then, the core 140 transmits the read data to the host terminal 104 via the buffer area 212 and the cache area 213 (Step S1010). Then, the core 140 ends the IO processing.

Specifically, the core 140 writes the read data written in the buffer area 212 by the NVMe drive into the cache area 213, and then transmits the read data to the host terminal 104.

In a case where it is determined, in Step S1002, that the cache area 213 is used, the core 140 determines whether or not allocating a segment in the cache area 213 in the storage system 100 is possible (Step S1003). That is, it is determined whether or not a not-used storage area for storing the read data is provided in the cache area 213.

Specifically, the core 140 determines whether or not allocating the segment is possible, based on the free space of the cache area 213 in each memory 131 of the storage system 100.

In a case where it is determined that allocating the segment in the cache area 213 in the storage system 100 is possible, the core 140 determines whether or not allocating the segment in the permitted cache area 213 which is set by the controller 120 including the core 140 and is allocated to the NVMe drive storing the read data is possible (Step S1004).

Specifically, the core 140 refers to the area allocation management information 400 and searches for an entry in which identification information of a virtual storage drive corresponding to the NVMe drive storing the read data is set in the virtual drive ID 401. The core 140 determines whether or not allocating the segment is possible, based on the free space of the cache area 213 corresponding to the cache area number 402 in the searched entry.

In a case where it is determined that allocating the segment in the permitted cache area 213 which is set by the controller 120 including the core 140 and is allocated to the NVMe drive storing the read data is possible, the core 140 allocates the segment in the permitted cache area 213 (Step S1005) and instructs the NVMe drive to transfer read data to the segment (Step S1006). The instruction includes information for reading the read data, information of the segment, and the like. The core 140 allocates the segment in the permitted cache area 213 based on the known cache control algorithm.

Then, the core 140 transmits the read data written in the permitted cache area 213 by the NVMe drive to the host terminal 104 (Step S1007). Then, the core 140 ends the IO processing.

In a case where it is determined, in Step S1004, that allocating the segment in the permitted cache area 213 which is set by the controller 120 including the core 140 and is allocated to the NVMe drive storing the read data is not possible, the core 140 allocates the segment in the buffer area 212 (Step S1017) and instructs the NVMe drive to transfer read data to the segment (Step S1018). The instruction includes information for reading the read data, information of the segment, and the like.

The core 140 transmits a segment allocating request for the permitted cache area 213 to other controller 120 in the same storage system 100 (Step S1019).

The core 140 of the other controller 120 which has received the request allocates the segment in the permitted cache area 213 allocated to the NVMe drive. The core 140 allocates the segment in the permitted cache area 213 based on the known cache control algorithm. The core 140 of the other controller 120 allocates the segment, and then transmits a response for a notification of Ready.

In a case where the core 140 receives a response for a notification (Ready) from the other controller 120 (Step S1020), the core 140 transfers data to the other controller 120 (Step S1021).

The core 140 of the other controller 120 receives the data, and then instructs the NVMe drive to transfer the read data to the segment.

Then, the core 140 transmits a data transmission request to the other controller 120 (Step S1022), and then ends the IO processing. In this case, the core 140 of the other controller 120 transmits the read data written in the permitted cache area 213 by the NVMe drive to the host terminal 104.

In Step S1003, in a case where it is determined that allocating the segment in the cache area 213 in the storage system 100 is not possible, the core 140 allocates the segment in the buffer area 212 (Step S1011) and instructs the NVMe drive to transfer the read data to the segment (Step S1012). The instruction includes information for reading the read data, information of the segment, and the like.

Then, the core 140 transmits a segment allocating request for the permitted cache area 213 to the other storage system 100 (Step S1013).

The core 140 of the other storage system 100 which has received the request allocates the segment in the permitted cache area 213 allocated to the NVMe drive. The core 140 allocates the segment in the permitted cache area 213 based on the known cache control algorithm. The core 140 of the other storage system 100 allocates the segment, and then transmits a response for a notification of Ready.

In a case where the core 140 receives a response for a notification of Ready from the other storage system 100 (Step S1014), the core 140 transfers the data to the other storage system 100 (Step S1015).

Then, the core 140 transmits a data transmission request to the other storage system 100 (Step S1016), and then ends the IO processing. In this case, the core 140 of the controller 120 in the other storage system 100 transmits read data written in the permitted cache area 213 by the NVMe drive to the host terminal 104.

Next, characteristics of the IO processing in the embodiment will be described.

Figure 16:
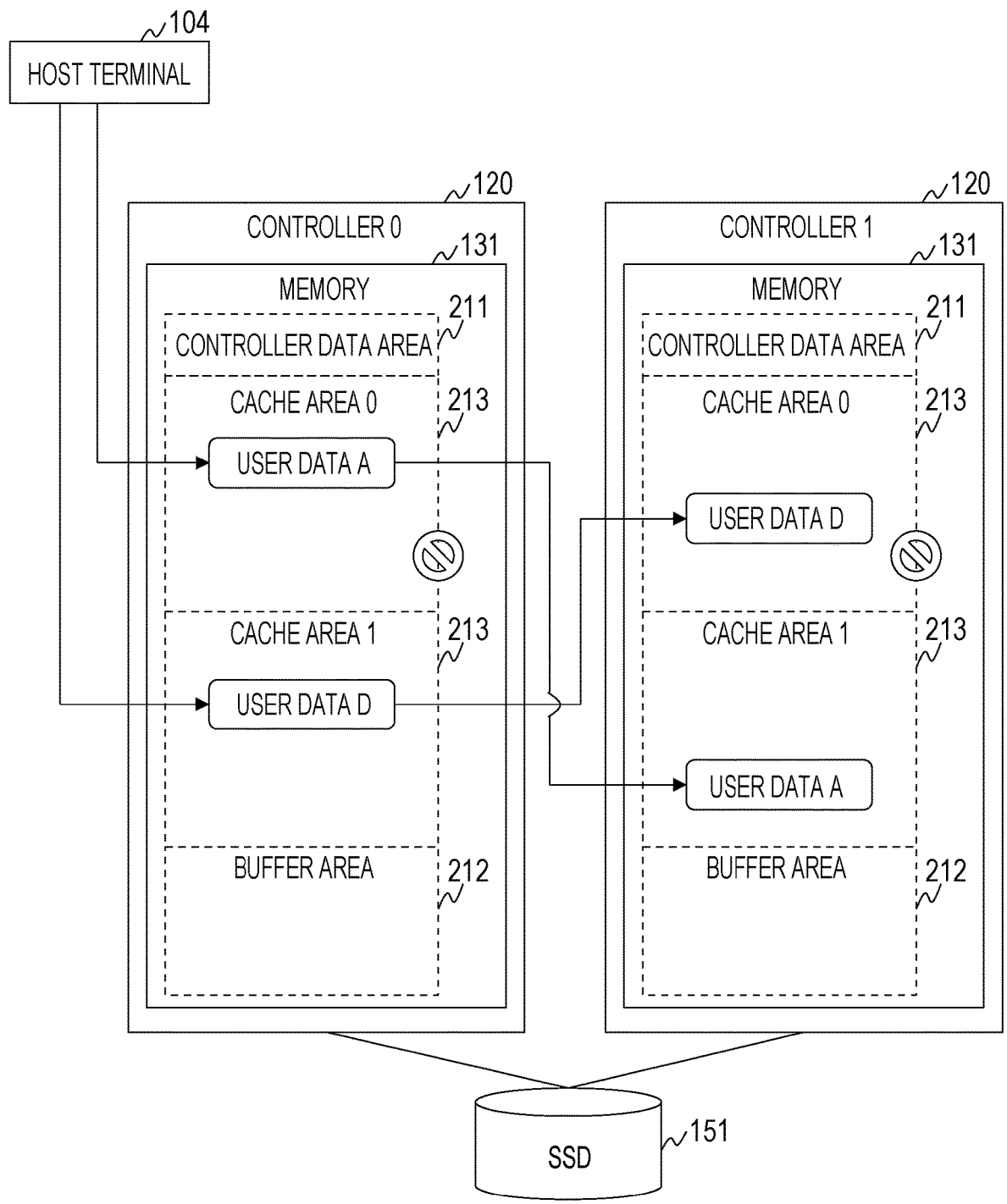
FIG. 16 is a diagram illustrating characteristics and effects of the IO processing performed in a case where the Write request is received in the embodiment.
Figure 17:
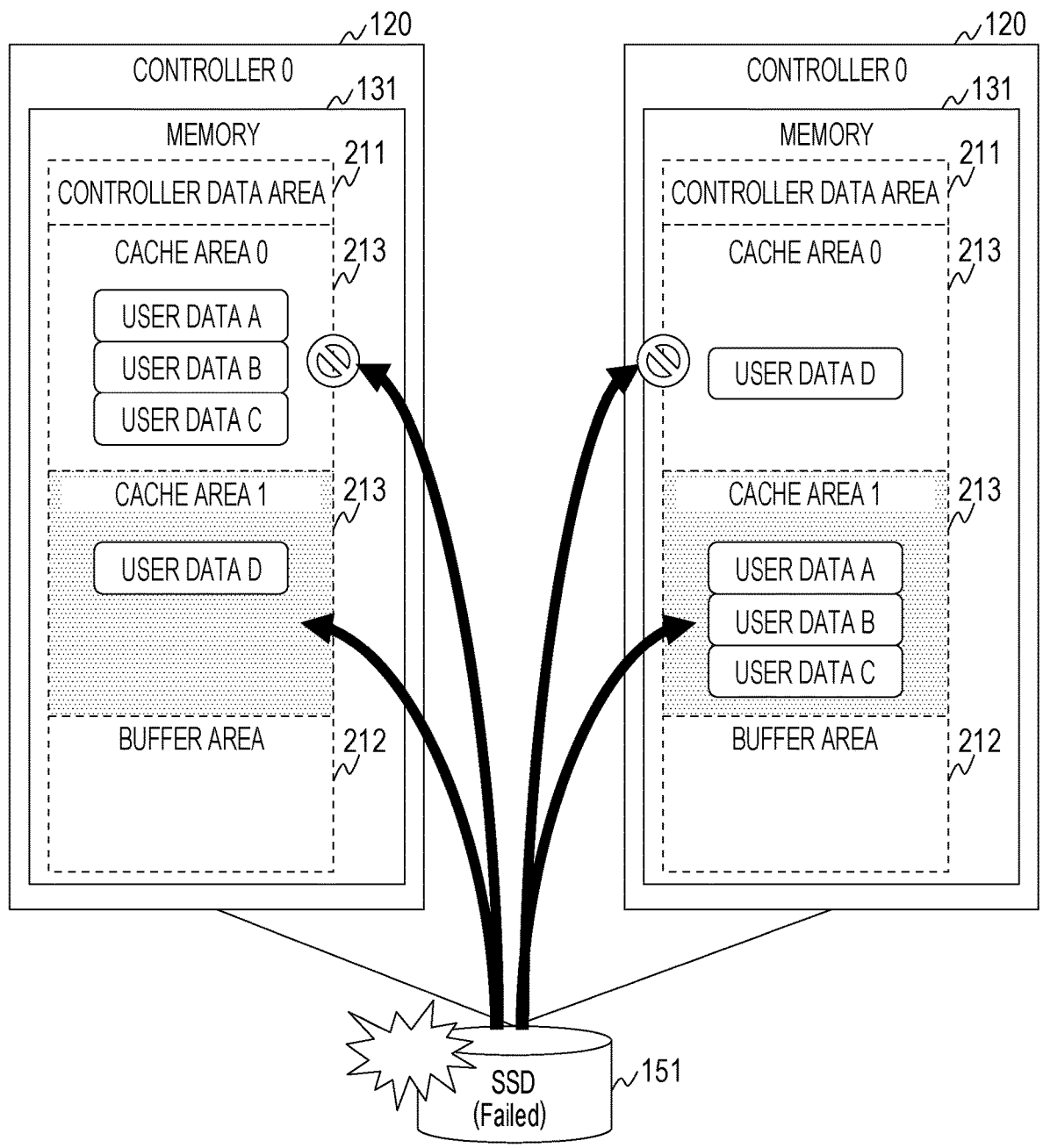
FIG. 17 is a diagram illustrating the characteristics and the effects of the IO processing performed in a case where the Write request is received in the embodiment.
Figure 18:
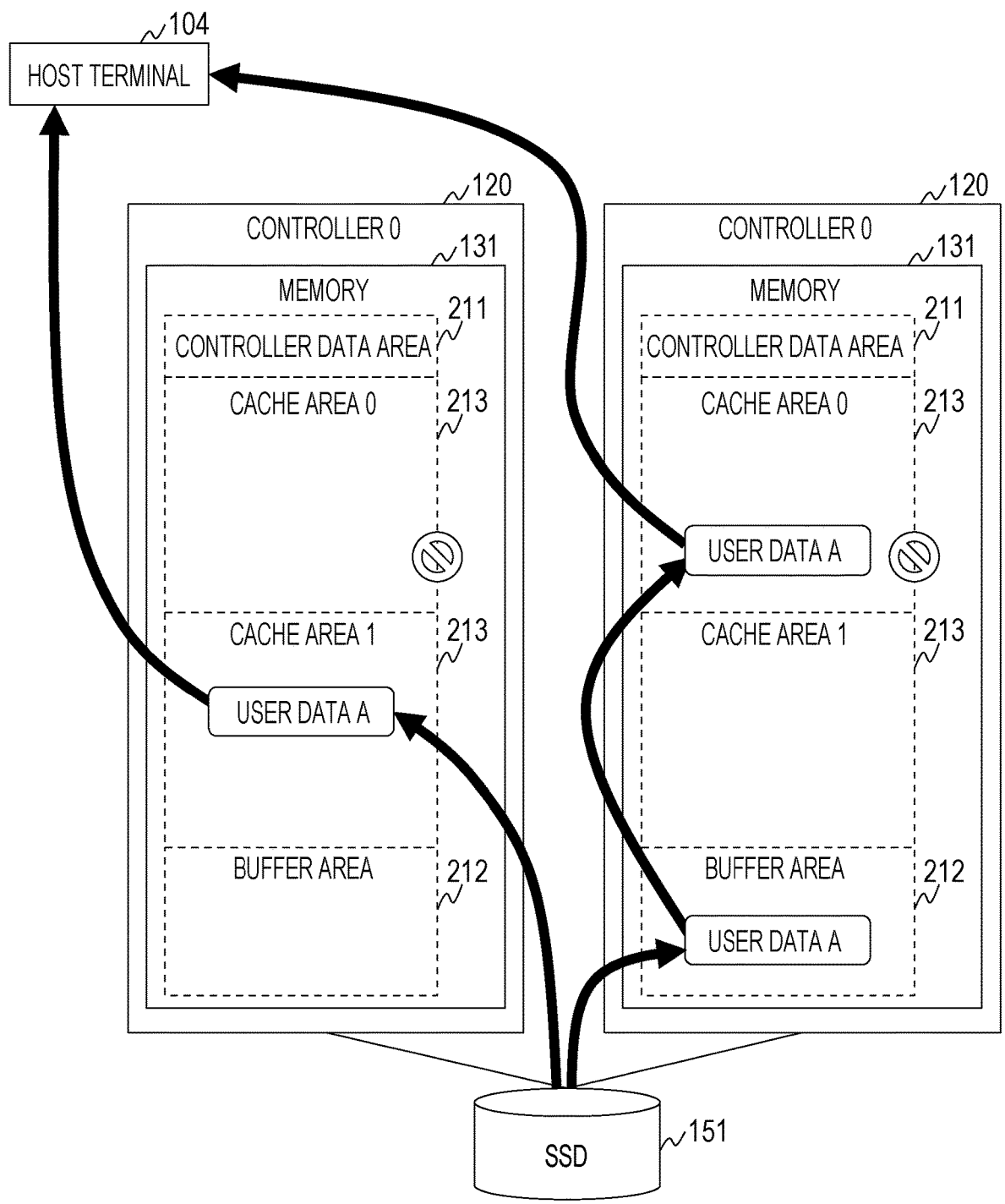
FIG. 18 is a diagram illustrating characteristics and effects of the IO processing performed in a case where the Read request is received in the embodiment.

FIGS. 16 and 17 are diagrams illustrating the characteristics and the effects of the IO processing performed in a case where the Write request is received in the embodiment. FIG. 18 is a diagram illustrating characteristics and effects of the IO processing performed in a case where the Read request is received in the embodiment.

As illustrated in FIG. 16, in a case where the core 140 has received write data (user data) from the host terminal 104, the core 140 can write data in two cache areas 213 having different access attributes of the NVMe drive, without rewriting the IO page table 223. Thus, it is possible to realize redundancy of data at a high speed. Thus, it is possible to avoid loss of dirty data by failure of the controller 120, and thus to improve reliability while maintaining the IO performance in the storage system 100.

As illustrated in FIG. 17, the NVMe drive can write data in the permitted cache area 213. However, it is not possible that the NVMe drive writes data in the non-permitted cache area 213. Thus, even in a case where invalid data is written by the NVMe drive in which failure and the like have occurred, it is possible to avoid destruction of data in the cache area 213. Thus, it is possible to improve reliability of the storage system 100.

As illustrated in FIG. 18, in processing of reading data in the related art, the NVMe drive writes read data in the buffer area 212, and the core 140 writes the read data into the cache area 213 from the buffer area 212. Then, the read data is transmitted to the host terminal 104. However, in the embodiment, the NVMe drive writes read data into the permitted cache area 213 without rewriting the IO page table 223, and the core 140 transmits the read data to the host terminal 104. Thus, it is possible to improve IO performance.

The present invention is not limited to the above embodiment, and various modification examples may be provided. For example, the configuration in the above embodiment is described in detail in order to explain the present invention in an easy-to-understand manner, and the above embodiment is not necessarily limited to a case including all the described configurations. A part of the configuration in each embodiment can be added, deleted, and replaced to, in, and with other configurations.

Some or all of the configurations, functions, functional units, processing means, and the like may be realized in hardware by being designed with an integrated circuit, for example. The present invention can also be realized by program codes of software that realizes the functions in the embodiment. In this case, a storage medium in which program codes are recorded is provided for a computer, and a processor in the computer reads the program codes stored in the storage medium. In this case, the program codes themselves read from the storage medium realize the functions of the above-described embodiment. The program code itself and the storage medium in which the program codes are stored constitute the present invention. As the storage medium for supplying such program codes, for example, a flexible disk, a CD-ROM, a DVD-ROM, a hard disk, a solid state drive (SSD), an optical disk, a magneto-optical disk, a CD-R, a magnetic tape, a non-volatile memory card, and a ROM are used.

The program codes for realizing the functions described in the embodiment can be implemented by wide range of programs or script languages, such as an assembler, C/C++, the perl, the shell, PHP, Python, and Java (registered trademark).

Further, the program codes of the software that realizes the functions in the embodiment may be distributed via the network, and thereby the program codes may be stored in a hard disk of the computer, storage means such as the memory, or a storage medium such as a CD-RW and a CD-R. The processor in the computer may read and execute the program code stored in the storage means or the storage medium.

In the above-described embodiment, control lines and information lines considered necessary for the descriptions are illustrated, and not all the control lines and the information lines in the product are necessarily shown. All components may be connected to each other.

What is claimed is:

1. A storage system comprising:
   a plurality of controllers, each including an arithmetic unit, a memory which is connected to the arithmetic unit and in which a cache area is set, and an interface connected to the arithmetic unit; and
   a plurality of storage drives,
   wherein a first cache area and a second cache area are set in each memory,
   wherein the controllers store page-table management information including memory access attributes indicating whether a read or a write is permitted to a corresponding physical memory address,
   wherein the first cache area is an area to which data written by the plurality of storage drives is permitted, and the second cache area is an area to which data written by the plurality of storage drives is not permitted, and wherein in a case where the plurality of controllers duplicate data stored in the cache area into a cache area of another controller for redundancy, the plurality of controllers causes the data to be redundant in a second cache area of the another controller in a case where the data is stored in the first cache area, and causes the data to be redundant in a first cache area of the another controller in a case where the data is stored in the second cache area, wherein a first controller of the plurality of controllers is configured to:

determine whether the storage drives are accessible via non-volatile memory express (NVMe) and upon determining the storage drives are accessible via non-volatile memory express (NVMe), select a cache area and determine whether the selected cache area is the first cache area, and upon determining the selected cache area is the first cache, set a head address of a target page and select a page size, add an entry to the page-table management information, including the head address of the target page and the page size and add information indicating read and write are permitted.

2. The storage system according to claim 1, wherein in a case where the plurality of controllers receives a read request for transmitting read data stored in the storage drives, the plurality of controllers instructs the storage drive to write the read data into the writable cache area of the memory, and transmits the data written in the cache area by the storage drive to a request source of the read request.

3. The storage system according to claim 1, wherein the plurality of controllers sets the first cache area and the second cache area and determine the cache-area write-enable state attribute of the storage drive, for each of the plurality of storage drives.

4. The storage system according to claim 3, wherein the plurality of controllers generates information for managing a correspondence relation between the storage drive and addresses of the first cache area and the second cache area.

5. A method of controlling a storage system including a plurality of controllers and a plurality of storage drives, each controller including an arithmetic unit, a memory, and an interface, the memory being connected to the arithmetic unit and in which a cache area is set, and the interface being connected to the arithmetic unit, wherein a first cache area and a second cache area are set in each memory, wherein the controllers store page-table management information including memory access attributes indicating whether a read or a write is permitted to a corresponding physical memory address, and wherein the first cache area is an area to which data written by the plurality of storage drives is permitted, and the second cache area is an area to which data written by the plurality of storage drives is not permitted, the method comprising:

in a case where the plurality of controllers duplicate data stored in the cache area into a cache area of another controller for redundancy, causing the data to be redundant in a second cache area of the another controller in a case where the data is stored in the first cache area, and causing the data to be redundant in a first cache area of the another controller in a case where the data is stored in the second cache area, by the plurality of controllers, wherein a first controller of the plurality of controllers is configured to execute steps comprising:

determining whether the storage drives are accessible via non-volatile memory express (NVMe) and upon determining the storage drives are accessible via non-volatile memory express (NVMe), selecting a cache area and determining whether the selected cache area is the first cache area, and upon determining the selected cache area is the first cache, setting a head address of a target page and selecting a page size, adding an entry to the page-table management information, including the head address of the target page and the page size and adding information indicating read and write are permitted.

6. The method of controlling a storage system according to claim 5, further comprising:

in a case where the plurality of controllers receives a read request for transmitting read data stored in the storage drives, by the plurality of controllers, instructing the storage drive to write the read data into the writable cache area of the memory; and transmitting the data written in the cache area by the storage drive to a request source of the read request.

7. The method of controlling a storage system according to claim 5, wherein the causing of the data to be redundant includes setting the first cache area and the second cache area for each of the plurality of storage drives, by the plurality of controllers, and determining the cache-area write-enable state attribute of the storage drive by the plurality of controllers.

8. The method of controlling a storage system according to claim 7, wherein the causing of the data to be redundant further includes generating information for managing a correspondence relation between the storage drive and addresses of the first cache area and the second cache area by the plurality of controllers.

* * * * *